US011198513B1

(12) United States Patent
Milardo et al.

(10) Patent No.: US 11,198,513 B1
(45) Date of Patent: Dec. 14, 2021

(54) ANTI-ICING/DE-ICING SYSTEM AND METHOD

(71) Applicant: Astroseal Products Mfg. Corporation, Chester, CT (US)

(72) Inventors: Michael Milardo, Old Lyme, CT (US); Igor Giterman, Woodbridge, CT (US)

(73) Assignee: Astroseal Products Mfg. Corporation, Chester, CT (US)

( * ) Notice: Subject to any disclaimer, the term of this patent is extended or adjusted under 35 U.S.C. 154(b) by 124 days.

(21) Appl. No.: 16/384,284

(22) Filed: Apr. 15, 2019

Related U.S. Application Data

(60) Provisional application No. 62/714,170, filed on Aug. 3, 2018.

(51) Int. Cl.
| | |
|---|---|
| *B64D 15/14* | (2006.01) |
| *B64D 15/22* | (2006.01) |
| *B32B 5/26* | (2006.01) |
| *B32B 5/02* | (2006.01) |

(52) U.S. Cl.
CPC .............. *B64D 15/14* (2013.01); *B64D 15/22* (2013.01); *B32B 5/024* (2013.01); *B32B 5/26* (2013.01); *B32B 2605/18* (2013.01)

(58) Field of Classification Search
CPC ........ B64D 15/14; B64D 15/22; B64C 1/067; B32B 5/024; B32B 5/26; B32B 2605/18
See application file for complete search history.

(56) References Cited

U.S. PATENT DOCUMENTS

| | | | | |
|---|---|---|---|---|
| 5,361,183 | A * | 11/1994 | Wiese | B64D 45/00 361/42 |
| 6,279,856 | B1 * | 8/2001 | Rutherford | B64D 15/14 244/134 D |
| 2013/0068747 | A1 * | 3/2013 | Armatorio | B64D 15/00 219/202 |
| 2014/0014640 | A1 * | 1/2014 | Calder | B64D 15/12 219/202 |
| 2014/0151353 | A1 * | 6/2014 | Steinwandel | H05B 3/145 219/202 |

* cited by examiner

*Primary Examiner* — Rodney A Bonnette
(74) *Attorney, Agent, or Firm* — Steven M. McHugh

(57) ABSTRACT

An anti-icing/de-icing system for an airfoil structure having multiple layers is provided and includes a thermal article, wherein the thermal article is embedded within the airfoil structure to be located between the multiple layers. The thermal article includes a first terminal end, a second terminal end and a thermal expanded mesh material which connects the first terminal end with the second terminal end, and wherein the thermal expanded mesh material is configured to have at least one predetermined resistance between the first terminal end and the second terminal end.

18 Claims, 24 Drawing Sheets

ANTI-ICING/DE-ICING SYSTEM AND METHOD

RELATED APPLICATIONS

This application is related to and claims the benefit of priority of the filing date of U.S. Provisional Patent Application Ser. No. 62/714,170 filed Aug. 3, 2018, the contents of which are incorporated by reference herein in its entirety.

FIELD OF THE INVENTION

The present invention relates generally to an anti-icing/de-icing system and method for airfoil surfaces and more particularly to an anti-icing/de-icing system and method for airfoil surfaces on aircraft and other articles, such as wind turbine blades, vehicle surfaces, propellers, rotors, turbines, etc.

BACKGROUND OF THE INVENTION

Referring to FIG. 1, an airfoil is a structure having one or more curved surfaces that are specifically designed to give the most favorable lift to drag ratio while a fluid is flowing over the airfoil surface. When part of an aircraft, these airfoil surfaces typically include, leading edge flaps, leading edge slats, ground spoilers, inboard flap, inboard aileron, inboard aileron tab, outboard flap, balance tab, outboard aileron, flight spoilers, rudders (upper and lower), anti-balance tabs, stabilizer, elevator and elevator tabs. And because the type and shape of the airfoil surface directly impacts the operating performance and characteristic of the airfoil surface, any change in the shape of these surfaces can have adverse effects on the performance of the airfoil surface. In fact, when part of an aircraft, even the slightest change in the shape of the airfoil surface can deleteriously affect the ability of the aircraft to remain in flight.

Unfortunately, however, because of the environment they operate in, these surfaces are prone to atmospheric ice build-up which can result in a change in the shape of the airfoil surface. For example, with regards to aircraft, when the aircraft is on the ground, precipitation falls onto the aircraft and freezes on the upper surfaces. This type of ice formation is typically managed by de-icing the plane with a de-icing fluid, such as propylene glycol. In the air, ice builds up on the airfoil surfaces (mainly the leading edge of these surfaces) as the aircraft is flying through atmosphere containing liquid (such as clouds made up of small liquid water droplets). And because the air temperatures at flight altitudes are typically below 32° F., as the aircraft is flying through this environment, when the water droplets impact the surface of the aircraft they freeze and form ice on the airfoil surfaces (such as the leading edge of the wings, the nose and the tail surfaces). To manage this ice formation, the aircraft is equipped with an anti-icing/de-icing system to prevent the formation ice and to facilitate the removal if ice builds up. It should be appreciated that similar problems effect other aerodynamic articles which employ airfoil surfaces, such as wind turbine blades, land vehicle surfaces, water vehicle surfaces, propellers, rotors, turbines, etc. For example, with wind turbine blades, ice accumulation prevents or significantly slows down blade rotation thereby reducing the electrical power generating efficiency of the wind turbine.

One type of de-icing system involves the use of a pneumatic deicing boot. This boot is usually made from layers of rubber with one or more air chambers between the layers. The boot is typically located on the leading of the aircraft's wings and stabilizers and is designed to be rapidly inflated and deflated to break the adhesive force between the ice and the rubber thereby allowing the ice to be carried away by the wind. Another type of deicing system is a 'bleed air' system which uses hot air that is 'bled' off the jet engine and directed through piccolo tubes that are routed through the aircraft wings, tail surfaces, and engine inlets. Still yet another type of deicing system is an electro-mechanical system which is typically referred to as an Electro-Mechanical Expulsion Deicing System, or EMEDS. The EMEDS is designed with an actuator that is moved to induce a shock wave in the protected surface to dislodge the ice thereby allowing the ice to be carried away by the wind.

Another type of deicing system is a fluid based system referred to as a TKS ice protection system which uses a glycol-based fluid to cover the critical surfaces of the aircraft to prevent the risk of any ice forming on the leading edges of the wings. The in-flight distribution of the glycol-based fluid is achieved by using porous panels on the leading edges of the airframe, where the panels are perforated with eight hundred 0.0025" diameter holes per square inch. The TKS fluid is thereby exuded through the hole onto the flight critical surface, such as the leading edges of the wings, and horizontal stabilizers. Still yet another type of deicing system is an electro-thermal system which uses electrical heaters which are weaved, sheets of continuous metal or heater blankets which are installed on the inside surface of an ice protected zone to prevent ice buildup in that area.

Unfortunately however, all of these systems are expensive to construct and integrate into aircraft and they all include several limitations that are undesirable, such as those related to manufacturability, power efficiency, robustness, reliability, weight, limitations in mechanical flexibility (pliability) and limitations in how close they can be installed to de-iced or anti-iced areas.

SUMMARY OF THE INVENTION

An anti-icing/de-icing system for an airfoil structure having multiple layers is provided and includes a thermal article, wherein the thermal article is embedded within the airfoil structure to be located between the multiple layers. The thermal article includes a first terminal end, a second terminal end and a thermal expanded mesh material which connects the first terminal end with the second terminal end, and wherein the thermal expanded mesh material is configured to have at least one predetermined resistance between the first terminal end and the second terminal end.

An anti-icing/de-icing system for an aircraft having an aircraft structure which includes a uni-material layer and a woven cloth layer is provided and includes a thermal article, wherein the thermal article is embedded within the aircraft structure to be located between the uni-material layer and a woven cloth layer. The thermal article includes a first terminal end, a second terminal end and a thermal expanded mesh material which connects the first terminal end with the second terminal end, wherein the thermal expanded mesh material is configured to have at least one predetermined resistance between the first terminal end and the second terminal end.

An anti-icing/de-icing system for an aircraft having an aircraft structure which includes a first woven cloth material layer, a uni-material layer, a second woven cloth material layer, a pre-copper mesh layer and a painted surface layer is provided. The anti-icing/de-icing system includes a thermal article, wherein the thermal article is embedded within the aircraft structure to be located between the uni-material layer and the second woven cloth layer, and wherein the thermal article includes a first terminal end, a second terminal end and a thermal expanded mesh material which connects the first terminal end with the second terminal end, wherein the thermal expanded mesh material is configured to have at least one predetermined resistance between the first terminal end and the second terminal end.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures.

DETAILED DESCRIPTION OF THE INVENTION

In accordance with the present invention, a novel anti-icing/de-icing system is provided and may be utilized on any article or vehicle which utilizes an airfoil surface to achieve aerodynamic efficiency, such as wind turbine rotor blades, aircraft rotor blades, propellers, impellers, surface vehicles, water vehicles, etc. Accordingly, although this invention is primarily disclosed herein with regards to aircraft, the invention may be applied to any surface, airfoil and/or non-airfoil surface, suitable to the desired end purpose, such as a wind turbine rotor blade.

Figure 1:
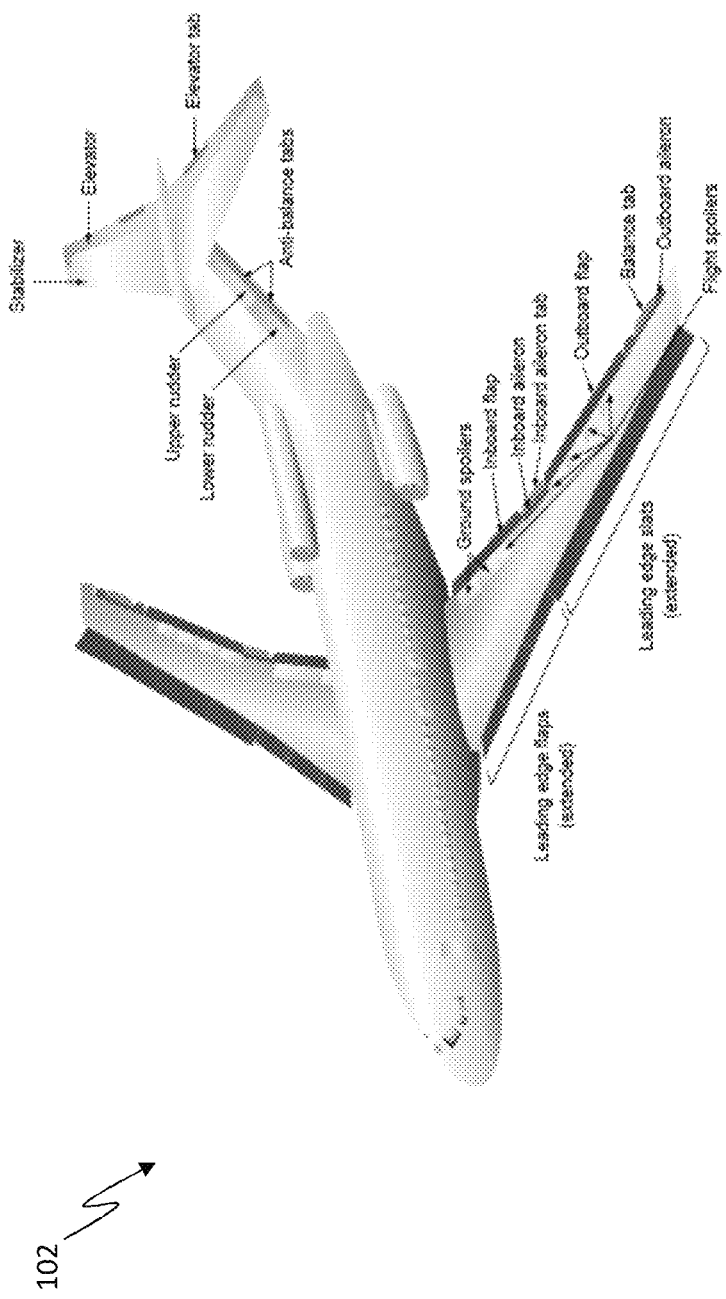
FIG. 1 shows a top down side view of an aircraft identifying some of the airfoil sections which need anti-icing/de-icing, in accordance with the prior art.
Figure 2:
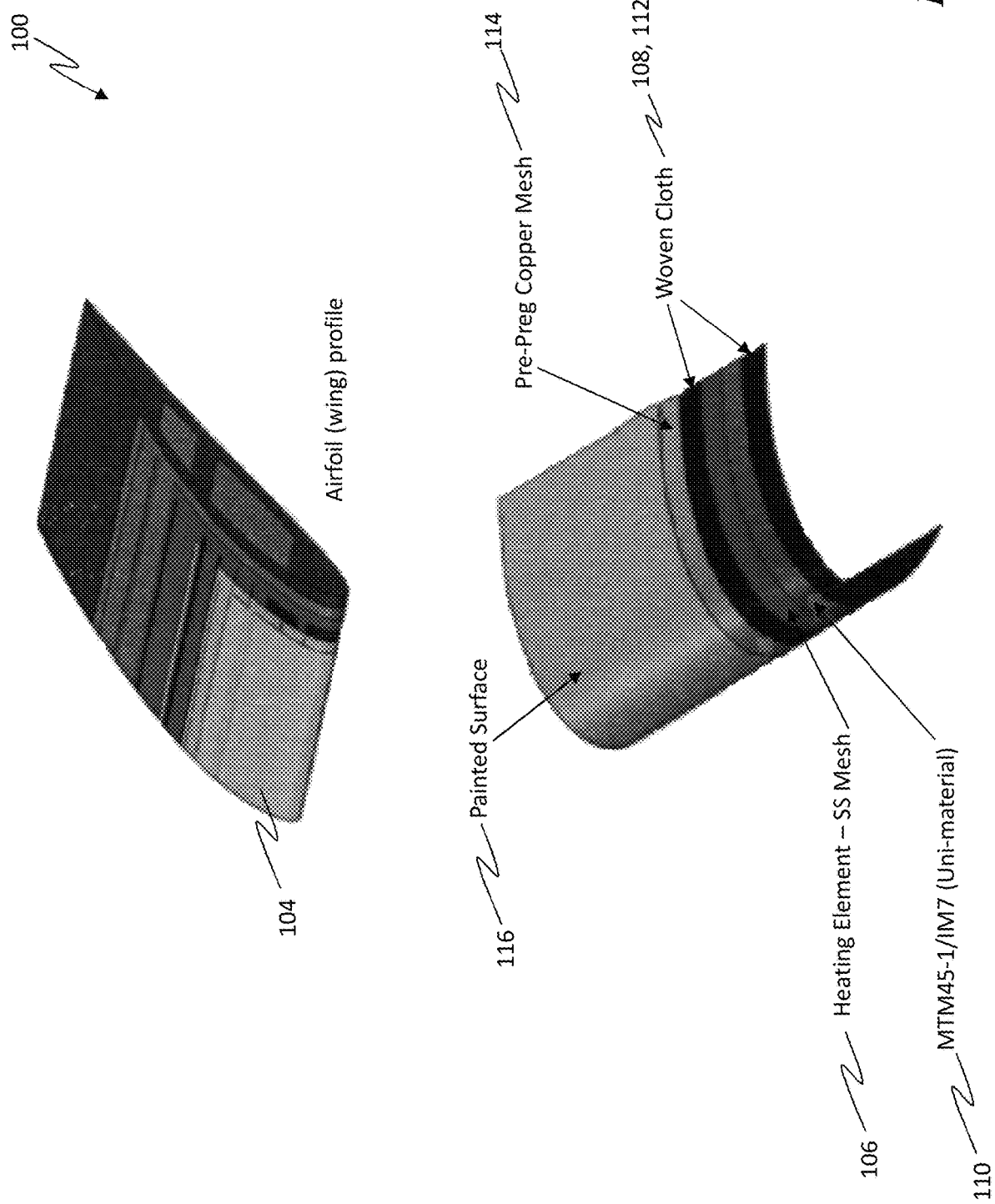
FIG. 2 shows side view of an airfoil structure/layup section having a thermal article, in accordance with one embodiment of the invention.

Referring to FIG. 2 and in accordance with the present invention, a novel anti-icing/de-icing system 100 for an aircraft 102 and/or other article requires anti-icing/de-icing capability, such as a wind turbine rotor blade, is provided, wherein a portion of the anti-icing/de-icing system 100 may be embedded into the aircraft (or system) structure 104 of one or more icing protected areas of the aircraft 102, such as, for example, the airfoils (See FIG. 1), leading edge slats, wing leading edges, horizontal stabilizers, empennage, engine inlet, propeller (turboprops) and/or propeller blades (helicopters). The anti-icing/de-icing system 100 in accordance with one embodiment of the invention is shown, wherein the anti-icing/de-icing system 100 includes a thermal article 106 which is configured to heat up when energized (i.e. applying a potential difference across the thermal article 106).

Figure 3A:
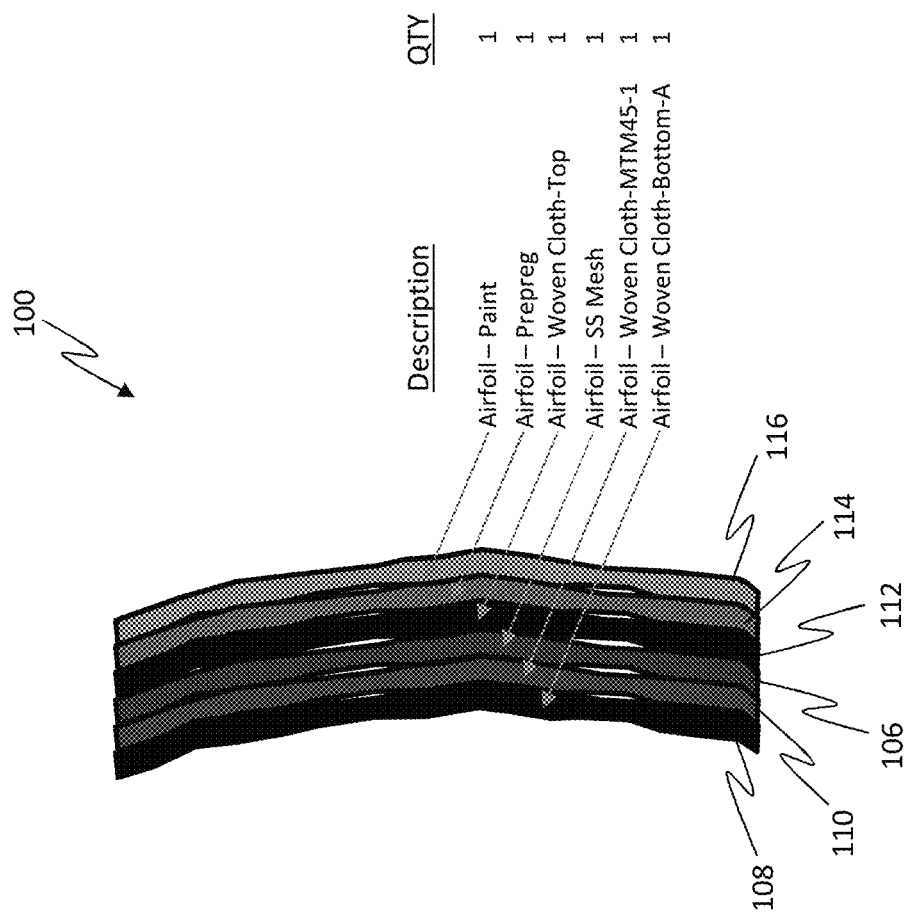
FIG. 3*a* shows a sectional view of the airfoil structure/layup section of FIG. 2, in accordance with one embodiment of the invention.
Figure 4:
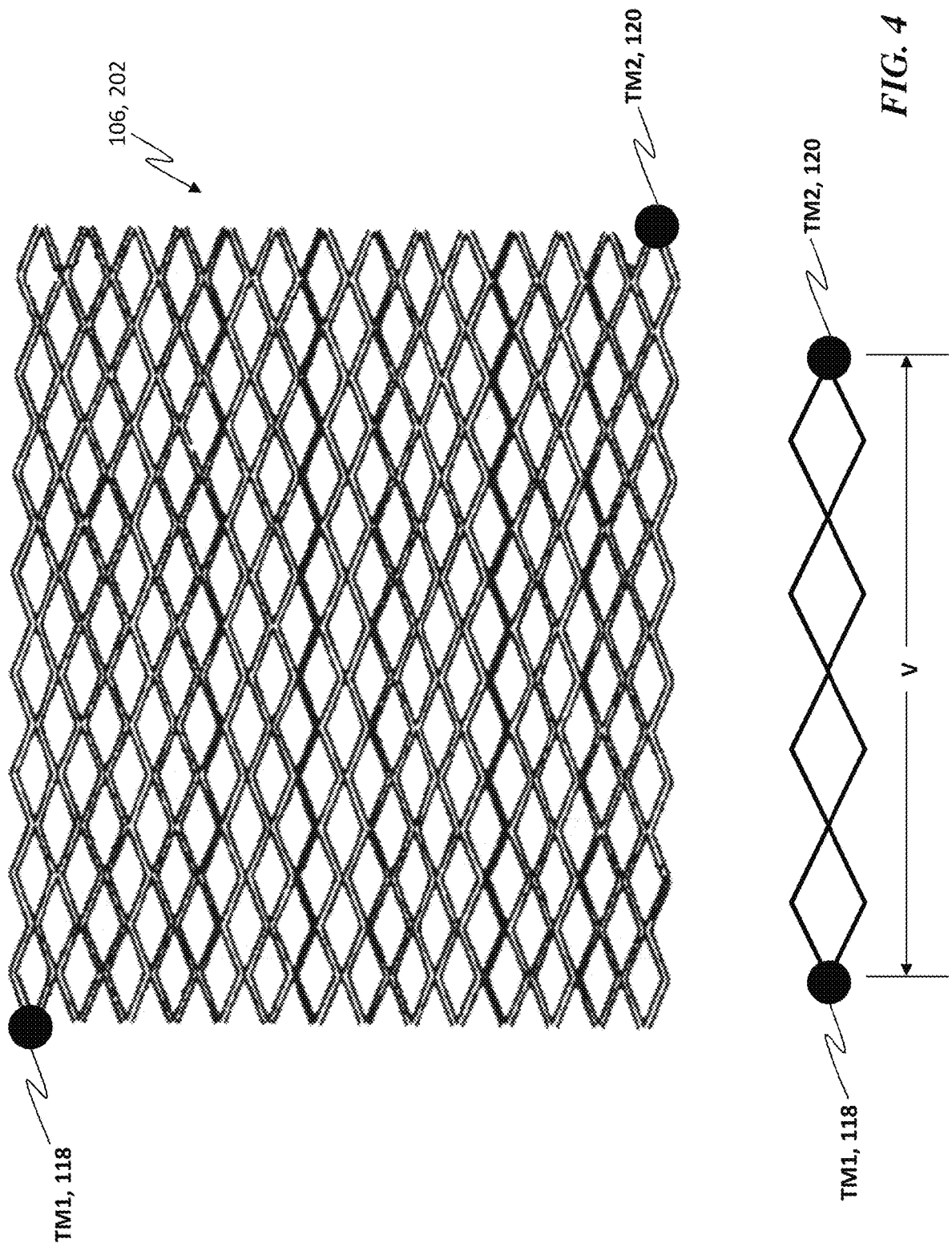
FIG. 4 shows the thermal article configured as a thermal mesh for use in the airfoil structure/layup section of FIG. 2, in accordance with one embodiment of the invention.

Referring to FIG. 3A and again to FIG. 2, in accordance with one embodiment of the invention, the thermal article 106 may be embedded and/or fabricated into the aircraft/system structure 104. It should be appreciated that the aircraft structure 104 or 'layup' is typically constructed from several layers of material which include a first woven cloth material layer 108, a uni-material layer 110, a second woven cloth layer 112, a pre-copper mesh layer 114 and a painted surface layer 116, wherein the first woven cloth material layer 108 is the internal layer and the painted surface layer 116 is the external layer of the aircraft structure 104. It should be appreciated that although the external layer of the aircraft structure 104 is referred to herein as being a painted surface layer 116, in other embodiments the external layer of the aircraft structure 104 may be a metal erosion shield. It is contemplated that the uni-material layer 110 may be any material suitable to the desired end purpose, such as a flexible curing temperature, high performance, toughened epoxy matrix system which is optimized for low pressure, vacuum bag processing, for example MTM® 45-1 Epoxy Matrix manufactured by Cytec Solvay Group. It should be appreciated that, in accordance with one embodiment of the invention, the thermal article 106 may be integrated with the aircraft structure 104 to be located or 'sandwiched' between the uni-material layer 110 and the second woven cloth layer 112. Referring to FIG. 4, the thermal article 106 may include a first thermal article terminal 118 and a second thermal article terminal 120, wherein thermal article 106 is configured such that when a potential difference V is placed between the first thermal article terminal TM1 118 and the second thermal article terminal TM2 120, the thermal article 106 heats up. It is contemplated that in some embodiments, the first thermal article terminal TMI 118 and/or second thermal article terminal TM2 120 may be one or more points and/or in other embodiments the first thermal article terminal TMI 118 and/or second thermal article terminal TM2 120 may be a surface area, such as along the edges of the thermal article 106. It should be appreciated that when the thermal article 106 heats up, the generated heat is thermally conducted to the outer surface of the aircraft structure 104 (i.e. the painted surface layer 116 in this embodiment) and prevents the formation of ice and/or causes the built-up ice to be removed. It should be appreciated that the thermal article 106 may be powered and/or controlled via the system (i.e. aircraft, wind turbine, etc) and/or the thermal article 106 may be powered and/or controlled via its own power supply and/or processor or any combination thereof, as desired.

Referring again to FIG. 4 and in accordance with one embodiment of the invention, the thermal article 106 is preferably configured as an expanded thermal mesh 202 and may be constructed from a flexible, light weight material which has a resistance R between the first thermal article terminal end TM1 118 and the second thermal article terminal end TM2 120. It should be appreciated that the resistance R may be consistent across the thermal mesh 202, the resistance R may be variable across the thermal mesh 202 (depending on the location on the thermal mesh 202) and/or the resistance R may be controllably adjustable across the thermal mesh 202. The expanded thermal mesh 202 is preferably very flexible, fixable and light weight and can be installed very close to anti-iced or de-iced areas and may use a mature, well established manufacturing processes to create and implement. The expanded thermal mesh 202 may be constructed from copper, aluminum, stainless steel, nickel copper and/or other pure metal and/or alloy and/or any material or combination of materials that can function as an electrically resistive component, suitable to the desired end purpose and/or may be constructed from any combination of metals and non-metal materials suitable to the desired end purpose. It should be appreciated that the actual configuration of the expanded thermal mesh 202 may be a function of the desired system requirements.

Figure 5:
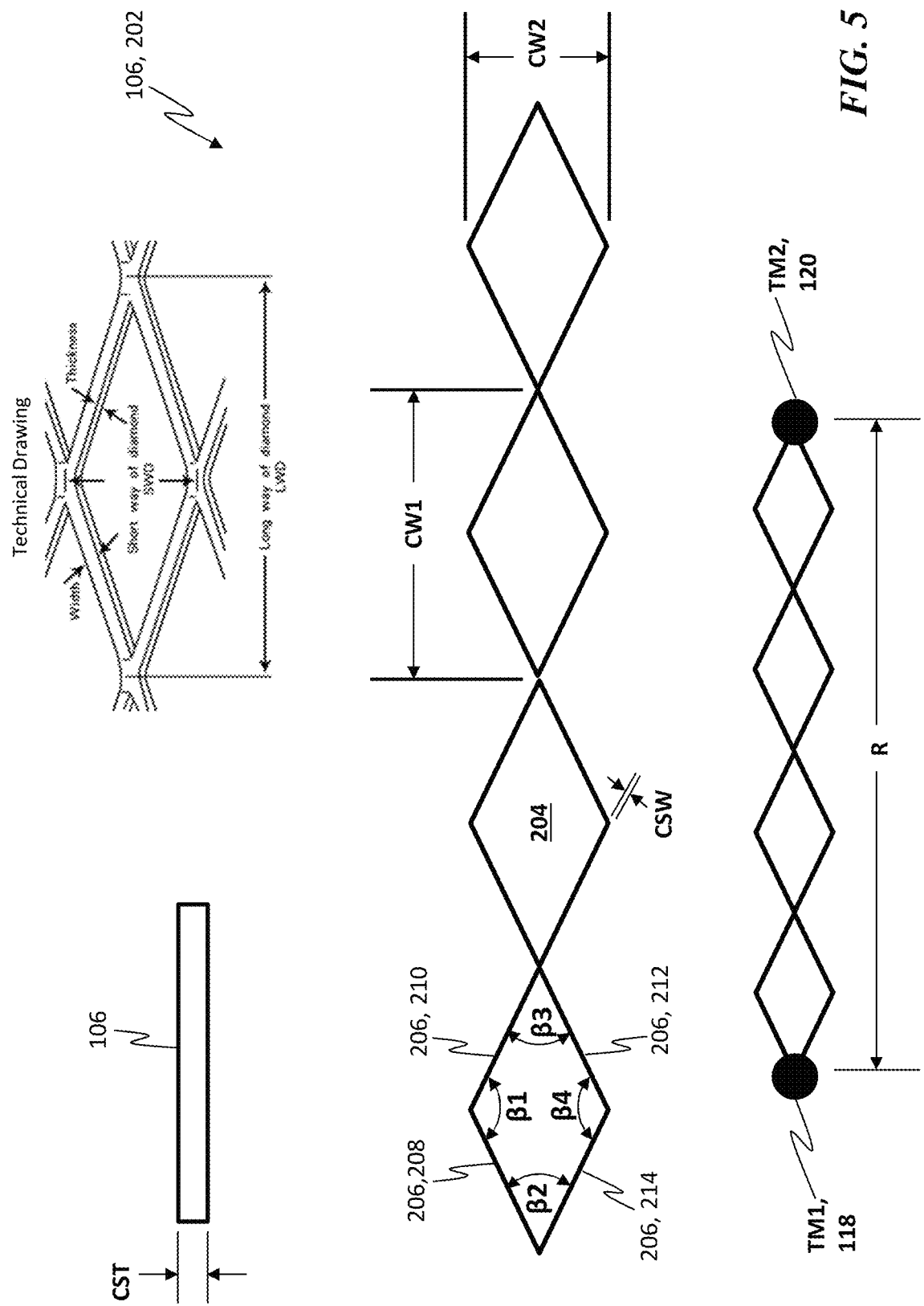
FIG. 5 shows a section of the thermal article of FIG. 4, in accordance with one embodiment of the invention.

Referring to FIG. 5 and again to FIG. 4, one embodiment of the thermal mesh 202 is shown, wherein the thermal mesh 202 includes a plurality of cavities 204 which are defined by cavity sides 206, wherein each of the plurality of cavity sides 206 includes a cavity side width CSW (also called width) and a cavity side thickness CST (also called thickness). Additionally, it should be appreciated that in one embodiment one or more of the plurality of cavities 204 may be diamond shaped (or substantially diamond shaped) and may include a cavity long width CW1 (also called LWD) and a cavity short width CW2 (also called SWD), wherein one or more of the cavity side width CSW, cavity side thickness CST, cavity long width CW1 and cavity short width CW2 may be a function of the desired system requirements. It should be appreciated that the cavity may also be equal pitch as desired. Moreover, the plurality of cavity sides 206 includes a first cavity side 208, a second cavity side 210, a third cavity side 212 and a fourth cavity side 214, wherein the first cavity side 208 and third cavity side 212 are connected to the second cavity side 210 at one end and the fourth cavity side 214 at the other end and wherein the second cavity side 210 and fourth cavity side 214 are connected to the first cavity side 208 at one end and the third cavity side 212 at the other end. It should be further appreciated that the thermal mesh 202 includes a material thickness (which includes cavity side thickness CST) which may have a uniform thickness across the thermal mesh or a variable thickness across the thermal mesh, as desired. It should be appreciated that although the plurality of cavities 204 are disclosed herein as being diamond (and/or substantially diamond) shaped, one or more of the plurality of cavities 204 may be any shape desired suitable to the desired end purpose, such as triangular, round, octagonal, rectangular, etc. . . . .

Furthermore, the first cavity side 208 is associated with the second cavity side 210 via a first angle β1 and the fourth cavity side 214 via a second angle β2 and the third cavity side 212 is associated with the second cavity side 210 via a third angle β3 and the fourth cavity side 214 via a fourth angle β4. It should be appreciated that one or more of the first angle β1, second angle β2, third angle β3, and/or fourth angle β4 may be equal to each other or they may be different as desired. It should be further appreciated that the size of each of the plurality of cavities 204 includes a cavity configuration that may differ from others of the plurality of cavities 204 across the thermal mesh 202 and/or the pattern of the thermal mesh 202 may or may not be uniform and may change as desired to allow controlling power density to allow for the most efficient design.

Figure 6:
FIG. 6 shows the thermal article configured as a thermal strip for use in the airfoil structure/layup section of FIG. 2, in accordance with another embodiment of the invention.
Figure 6:
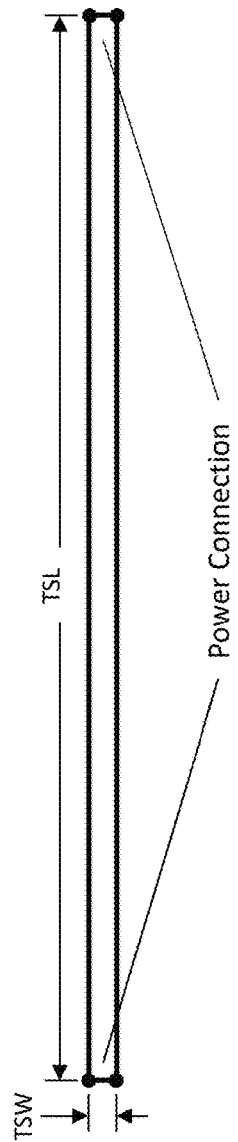

Referring to FIG. 6, another embodiment of the thermal article 106 is shown and is configured as a thermal strip 300, wherein the thermal strip 300 includes a first terminal end 304, a second terminal end 306, a thermal strip material 308 connecting the first terminal end 304 with the second terminal end 306. It should be appreciated that the thermal strip material 308 may include a thermal-strip length TSL, a thermal-strip width TSW and a thermal-strip thickness TST. It should also be appreciated that the locations of the first terminal end 304 and second terminal end 306 may be determined as desired and may be based on system requirements. Moreover, it should be further appreciated that the thermal-strip width TSW and thermal-strip thickness TST may or may not be uniform along the thermal-strip length TSL and may be determined by system requirements and/or as desired.

Figure 7A:
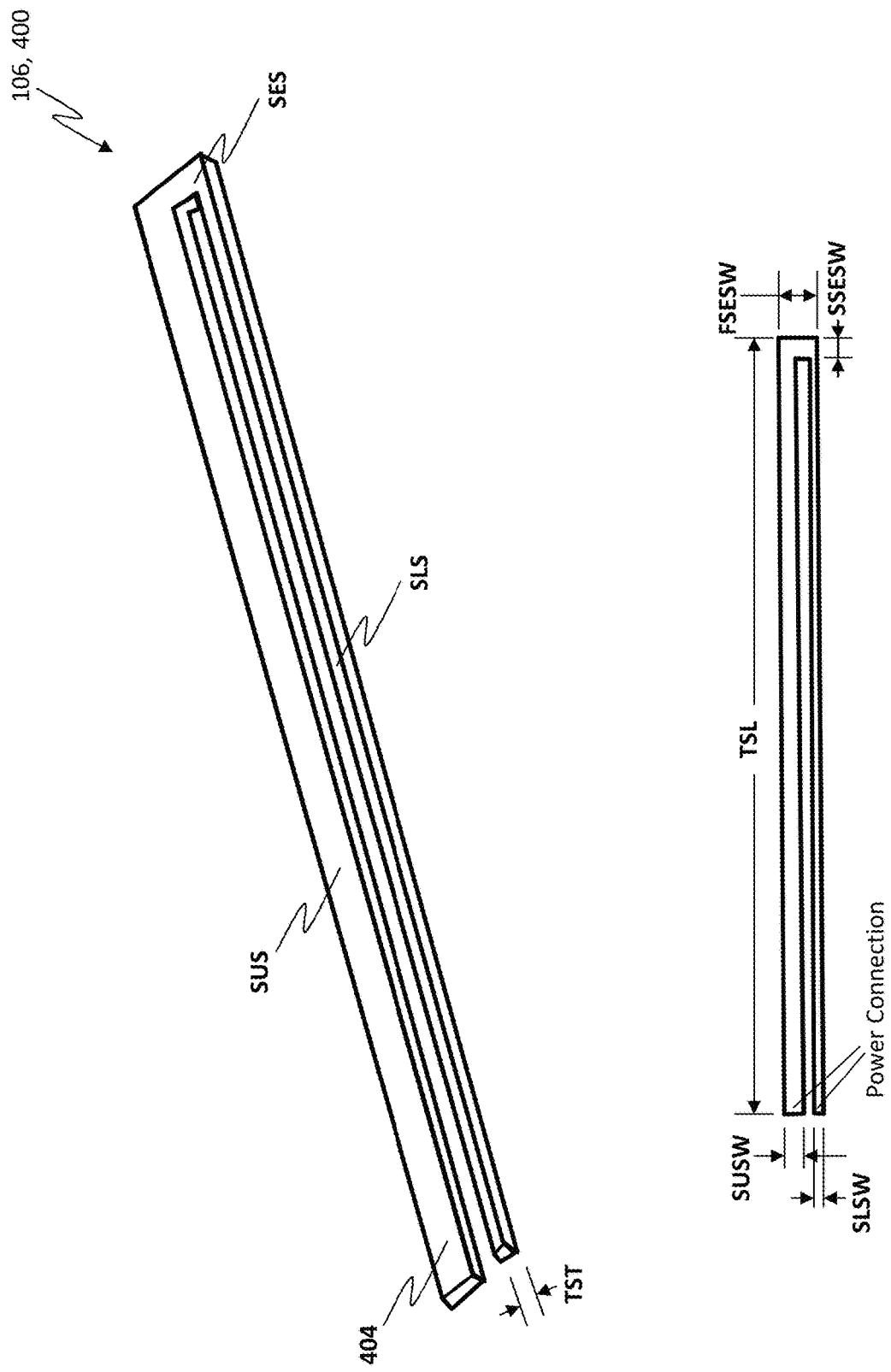
FIG. 7A shows the thermal article configured as a U-shaped thermal strip for use in the airfoil structure/layup section of FIG. 2, in accordance with still yet another embodiment of the invention.
Figure 7B:
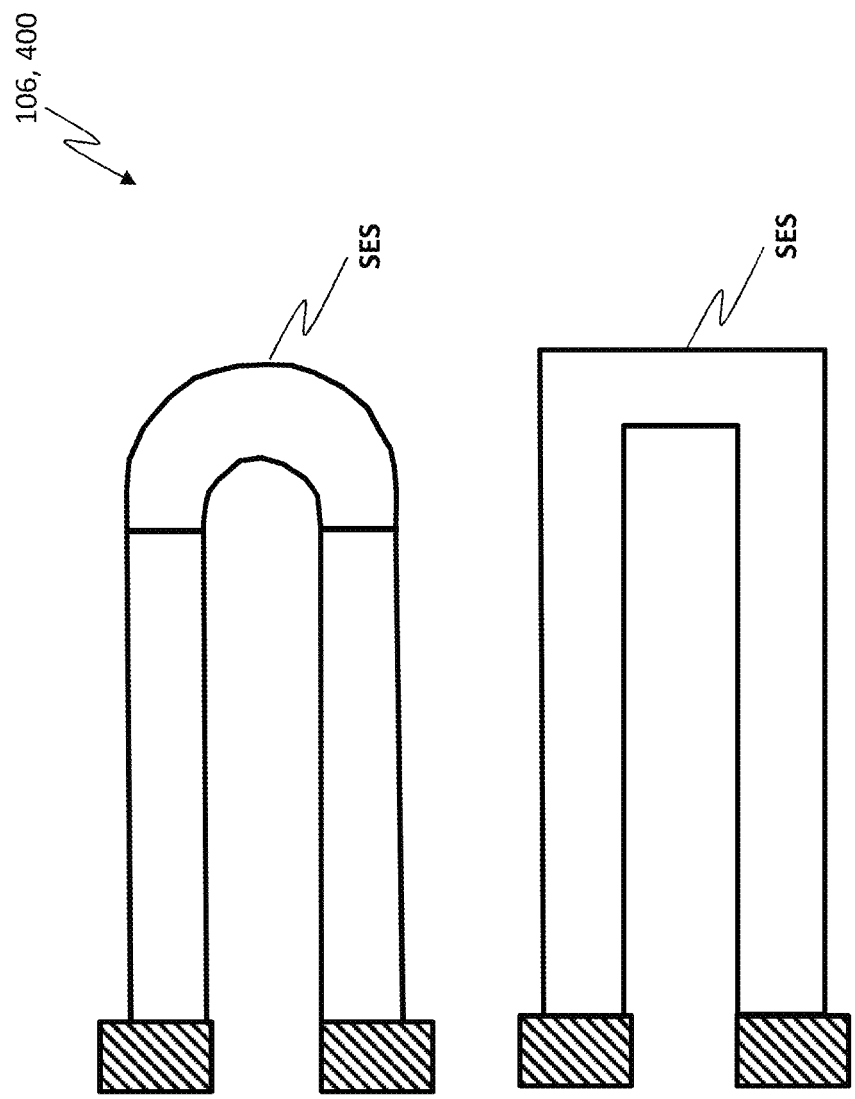
FIG. 7B shows the end section of the thermal article of FIG. 7A configured as round or square end, in accordance with still yet another embodiment of the invention.

Referring to FIG. 7A, still yet another embodiment of the thermal article 106 is shown and may be configured as a U-shaped thermal strip 400, wherein the thermal strip 400 includes a first terminal end 404, a second terminal end 406, a thermal-strip length TSL and a thermal-strip thickness TST. Additionally, the thermal strip 400 further includes a strip upper section SUS having a strip upper section width SUSW, a strip lower section SLS having a strip lower section width SLSW and a strip end section SES having a first strip end section width FSESW and a second strip end section width SSESW. It should be appreciated that the locations of the first terminal end 404 and second terminal end 406 may be determined as desired and may be based on system requirements. Moreover, it should be further appreciated that the strip upper section width SUSW, strip lower section width SLSW, strip end section width SESW, and/or thermal-strip thickness TST may or may not be uniform along the thermal-strip length TSL and may be determined by system requirements. Furthermore, referring to FIG. 7B, although shown as a rectangular (square) shaped closed end in FIG. 7A, the closed end may be any shape suitable to the desired end purpose, such as round, square, triangular, etc.

Figure 8A:
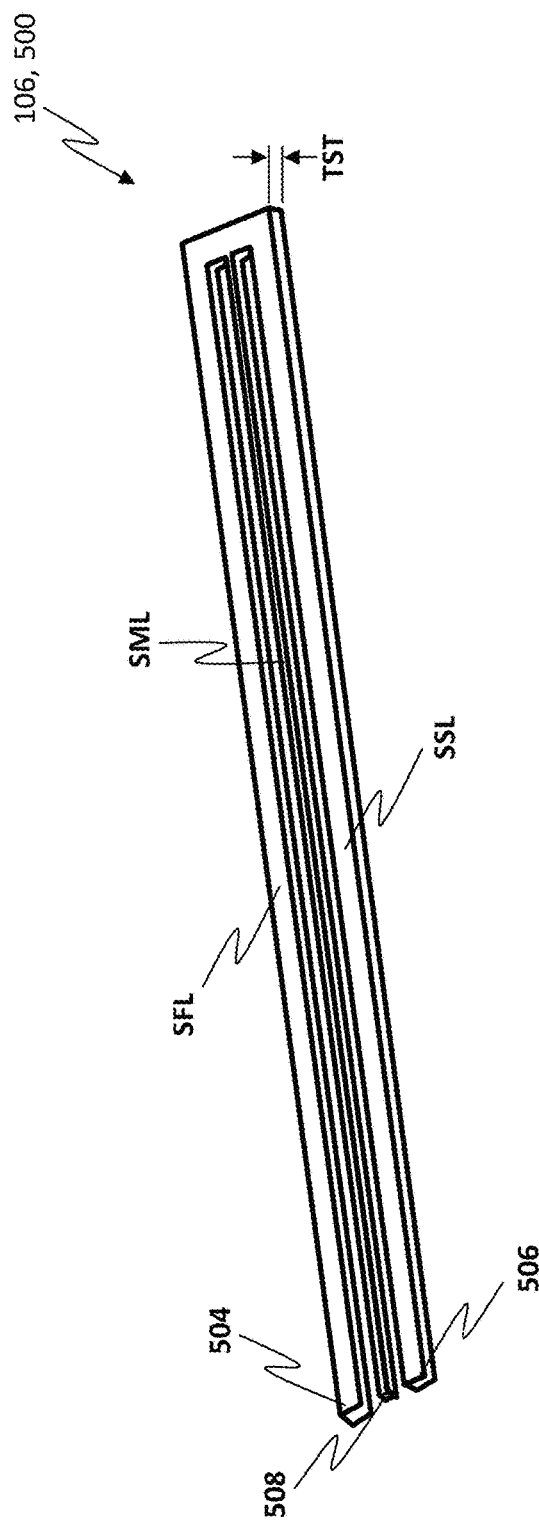
FIG. 8A shows a top side view isometric view of a thermal article configured as a W-shaped thermal strip for use in the airfoil structure/layup section of FIG. 2, in accordance with still yet another embodiment of the invention.
Figure 8B:
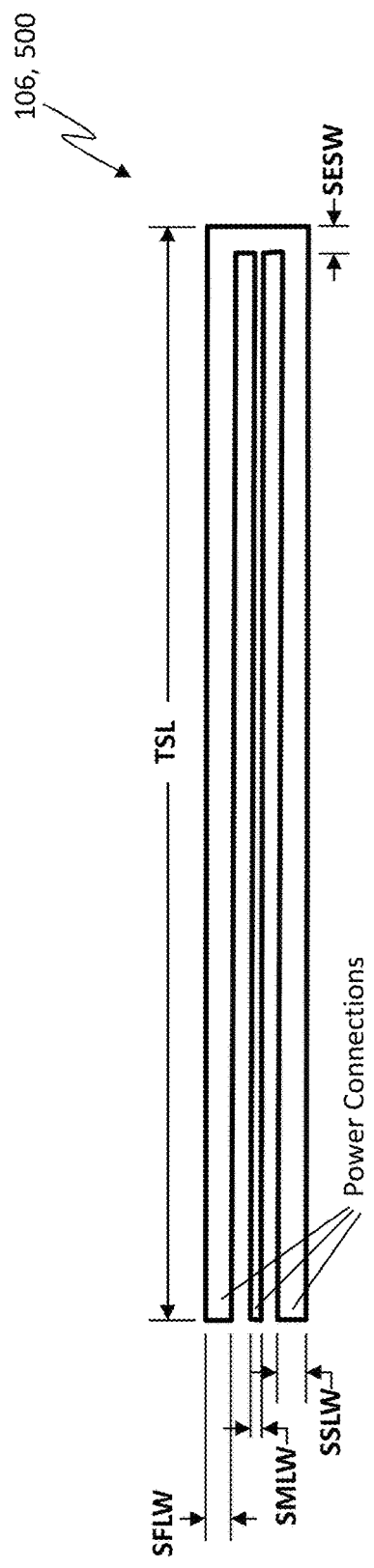
FIG. 8B shows a top down view of the thermal article of FIG. 8A.
Figure 8C:
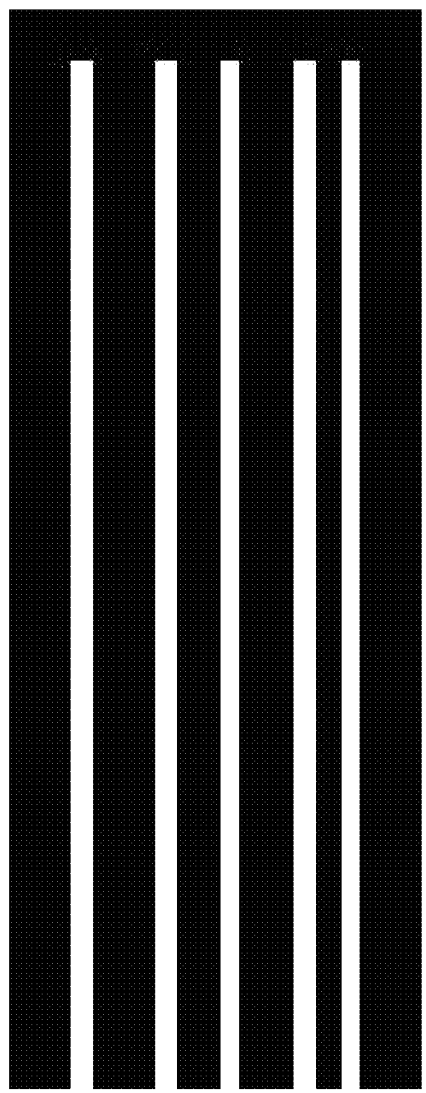
FIG. 8C shows another configuration of the thermal article of FIG. 8A, in accordance with still yet another embodiment of the invention.
Figure 8D:
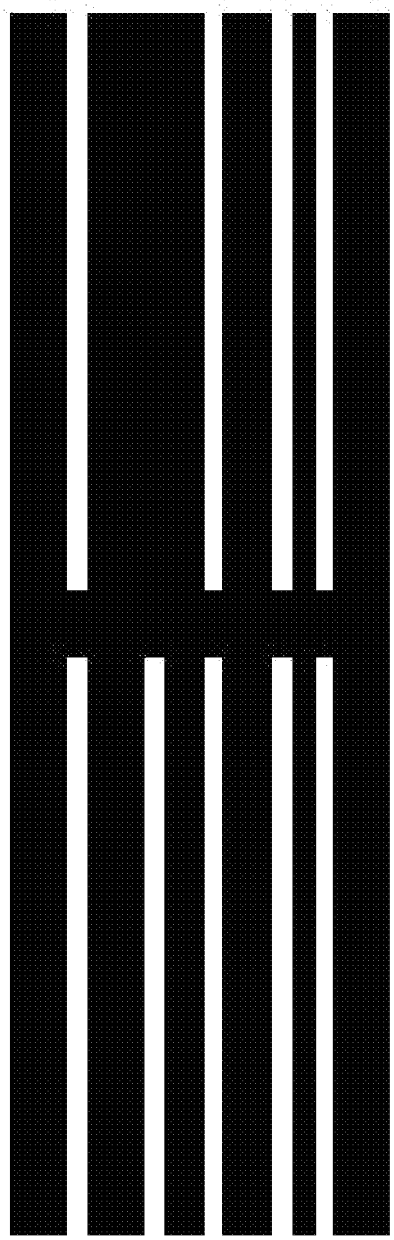
FIG. 8D shows another configuration of the thermal article of FIG. 8A, in accordance with still yet another embodiment of the invention.
Figure 8E:
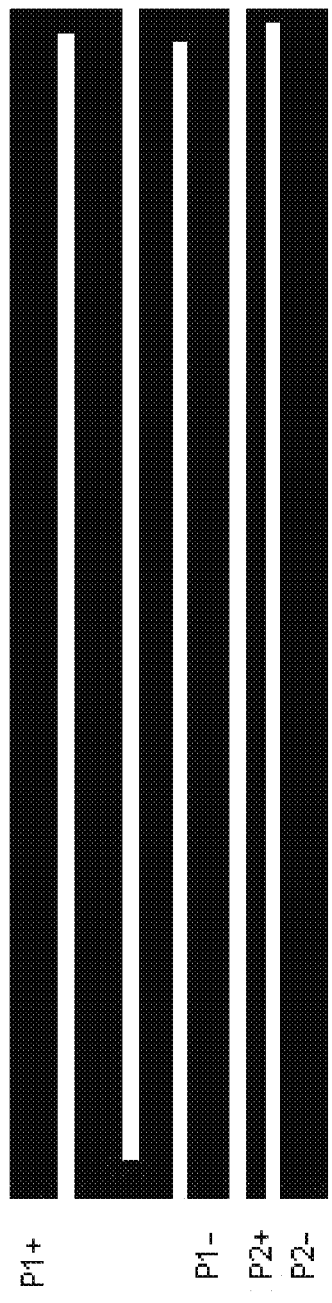
FIG. 8E shows another configuration of the thermal article of FIG. 8A, in accordance with still yet another embodiment of the invention.
Figure 8F:
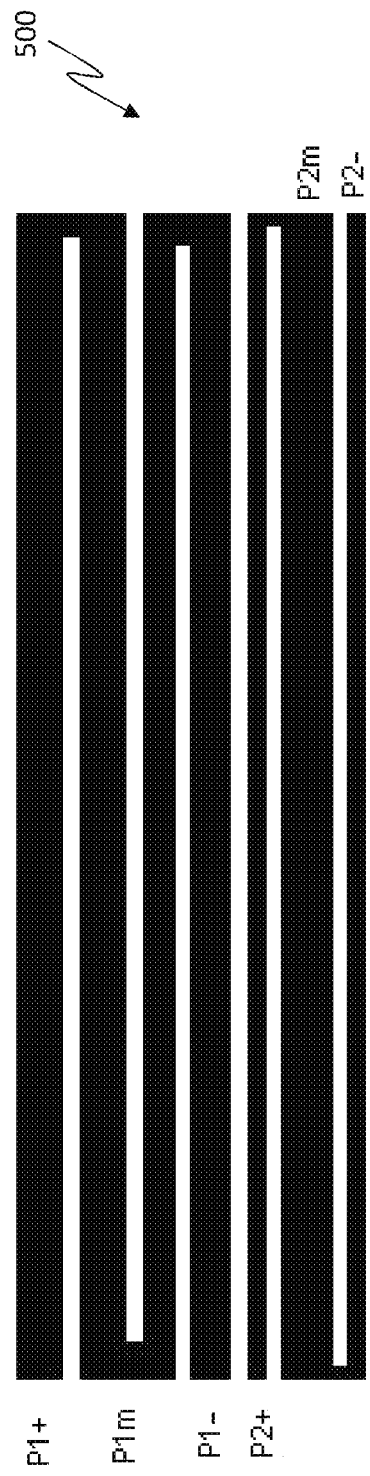
FIG. 8F shows another configuration of the thermal article of FIG. 8A, in accordance with still yet another embodiment of the invention.

Still yet another embodiment of the thermal article 106 is provided and may be configured to include multiple terminal legs, such as a W-shaped thermal strip 500 shown in FIG. 8A and FIG. 8B, wherein the thermal strip 500 includes a first terminal end 504, a second terminal end 506, a third terminal end 508, a thermal-strip length TSL and a thermal-strip thickness TST. Additionally, the thermal strip 500 further includes a strip first leg SFL having a strip first leg width SFLW, a strip middle leg SML having a strip middle leg width SMLW, a strip second leg SSL having a strip second leg width SSLW and a strip end section SES having a strip end section width SESW. It should be appreciated that the locations of the first terminal end 504, second terminal end 506 and third terminal end 508 may be determined as desired and may be based on system requirements. Moreover, it should be further appreciated that the strip upper leg width SFLW, strip middle leg width SMLW, strip lower leg width SSLW, strip end section width SESW, and/or thermal-strip thickness TST may or may not be uniform along the thermal-strip length TSL and may be determined by system requirements. Furthermore, the closed end of the thermal strip 500 may be any shape suitable to the desired end purpose, such as round, square, triangular, etc. Moreover, it is contemplated that the strip first leg SFL, strip middle leg SML and/or strip second leg SSL, may have varying lengths and may not be uniform, as desired.

It should be appreciated that in one or more embodiments, the thermal strip 500 shown in FIG. 8A and FIG. 8B may be only one section of the thermal article 106, wherein the thermal article 106 may include multiple sections of thermal strip 500 (some of which may have varying shapes and/or configurations). Moreover, each section of thermal strip 500 may be individually controlled and/or powered for any specified duration (and/or duty cycle) in any sequence and/or each section of thermal strip 500 may be controlled and/or powered as a system, as desired. In one embodiment, the power applied across the thermal strips 500 may be powered and/or controlled in a desired sequence which may be responsive by system requirements. For example, power may be connected between first terminal end 504 and third terminal end 508 during a first time period T1, and then power may be connected between second terminal end 506 and third terminal end 508 during a second time period T2, thereby allowing the power to be cycled, as desired. The order and duration of T1 and T2 may be responsive to system requirements and/or any other factors as necessary. In a system that includes many sections of thermal strip 500, each of these sections may be powered in a specific sequence as defined by the system requirements and/or as desired. It should be appreciated that the resistance between terminal points on the thermal strip 500 may be responsive, at least in part, to the width of the legs SFLW, SMLW, SSLW of the thermal strip 500. Accordingly, as the width of the legs of the thermal strip 500 increase the resistance decreases and conversely as the width of the legs of the thermal strip 500 decrease the resistance increases. Referring to FIG. 8C through FIG. 8F, various other embodiments of thermal strip 500 are shown, wherein P1+ is the first positive power terminal, P2+ is the second positive power terminal, P1− is the first negative power terminal and P2− is the second negative power terminal. It should be appreciated that P1+, P2+, P1− and/or P2− may be connected to any type of power source as desired, such as AC or DC.

Figure 9A:
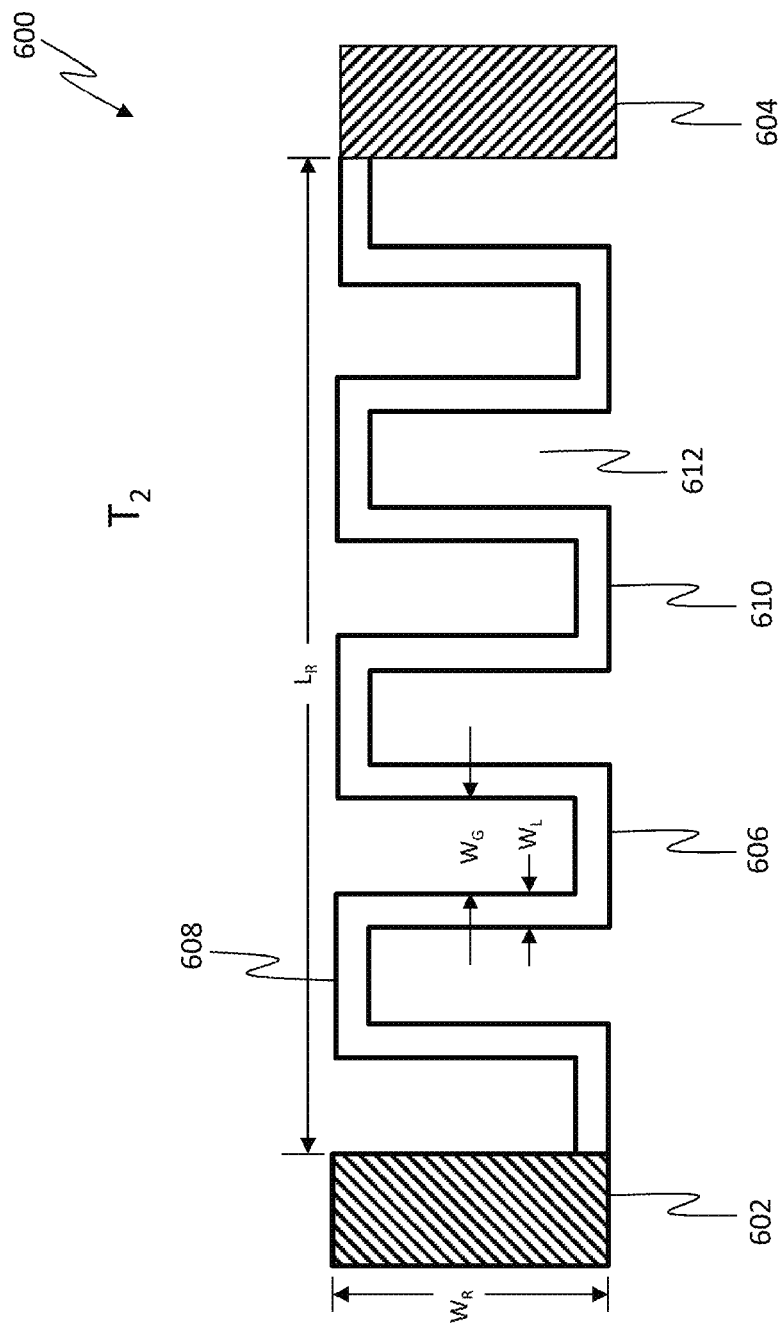
FIG. 9A shows a thermal article configured in a Méandre (serpentine like) design for use in the airfoil structure/layup section of FIG. 2, in accordance with still yet another embodiment of the invention.

Referring to FIG. 9A, a thermal article 600 which is configured as a Méandre configured thermal article 600, is shown in accordance with still yet another embodiment. It should be appreciated that this configuration allows the thermal characteristics of the thermal article 600 to be controllably configured by increasing and/or decreasing the length and/or width of sections of the thermal article 600 to effectively increase and/or decrease the resistance of the thermal article 600. In this way, the thermal characteristics, and thus, de-icing/anti-icing capability, of the thermal article 600 may be controllable and configurable. For example, referring to FIG. 9A, the thermal article 600 includes a first terminal end 602, a second terminal end 604 and a thermal article element 606, wherein the first terminal end 602 is connected to the second terminal end 604 via the thermal article element 606. Additionally, because the thermal article element 606 has a continuous méandre or serpentine style design, the thermal article element 606 includes a plurality of thermal article element heads 608, a plurality of thermal article element toes 610, a plurality of thermal article element gaps 612, a thermal article element width $W_L$, a thermal article element gap width $W_G$ and a thermal article element length $L_R$.

Figure 9B:
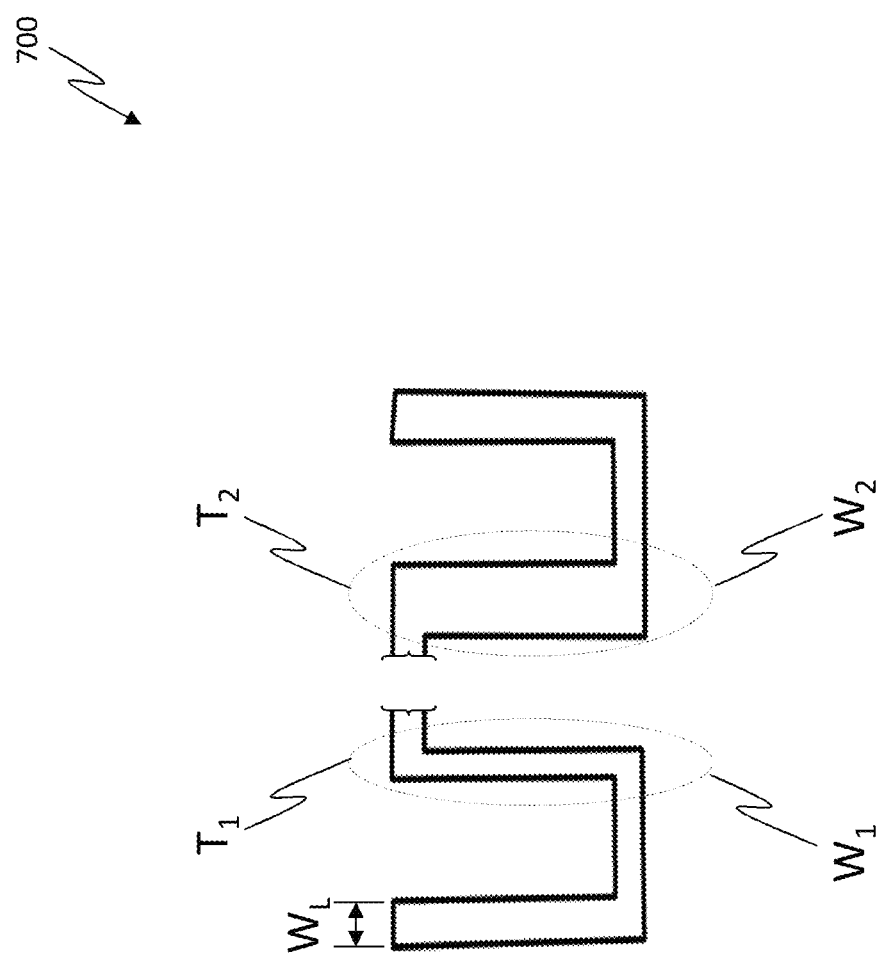
FIG. 9B shows a section of the thermal article of FIG. 9A having a varying width, in accordance with still yet another embodiment of the invention.

As briefly discussed with regards to the embodiments shown in FIG. 8A to FIG. 8E, the resistance between the first terminal end 602 and the second terminal end 604 terminal may vary and may be responsive to the width and/or thickness of the thermal article element 606 along its length $L_R$. As the thermal article element width $W_L$ and/or thickness increases the resistance of the thermal article element 506 decreases and conversely as the width and/or thickness of the thermal article element $W_L$ decreases the resistance increases. This advantageously allows the thermal article element 606 to heat up to different temperatures at different locations along the thermal article element length $L_R$ depending upon the thermal article element width $W_L$ and/or thickness at the relevant location. For example, referring to FIG. 9B, one embodiment of a thermal article element 700 is shown where the thermal article element 700 includes a varying thermal article element width $W_L$, where in one location the thermal article element width $W_L$ is $W_1$ and in another location the thermal article element width $W_L$ is $W_2$. As can be seen, thermal article element width $W_2$ is larger than thermal article element width $W_1$. In this embodiment, the temperature $T_1$ of the thermal article element 700 in the location of $W_1$ is larger than the temperature $T_2$ of the thermal article element 700 in the location of $W_2$. Moreover, it should be appreciated that the thermal article element width and/or thickness may be uniform or variable across all or part of the thermal article element length $L_R$.

It should also be appreciated that the thermal article 106 may be associated with the pre-copper mesh layer 114 to act as redundant lighting strike protection. Accordingly, if the aircraft structure is hit by a lightning strike and the pre-copper mesh layer 114 is damaged and/or compromised, then the thermal article 106 may be configurable to be used as lightning strike protection. In one embodiment, the thermal article 106, may be connected to the pre-copper mesh layer 114 via a controllable isolation switch. For example, during normal operation, the thermal article 106 is connected to the aircraft power/control system to allow the thermal article 106 to function as an anti-icing/de-icing article. If the aircraft is struck by lightning and the pre-copper mesh layer 114 is damaged and/or compromised, the controllable isolation switch can be operated to isolate the thermal article 106 from the aircraft system and thereby direct any lightning energy away from operationally critical equipment. Additionally, it is further contemplated that the pre-copper mesh layer 114 may also be configured to as a thermal article as well. Accordingly, if any section of thermal article 106 fails, the pre-copper mesh layer 114 may be configured to be energized to function as a redundant heater. Accordingly, when used as lightning strike protection the pre-copper mesh layer 114 is configured to be isolated from aircraft components (flight and/or non-flight critical) and when used as a thermal article the pre-copper mesh layer 114 is configured to be associated with power and/or control articles to control the thermal function.

It should be appreciated that this configurable isolation/de-isolation may be automatically controlled via a processing device as desired. As such, thermal article 106 and pre-copper mesh layer 114 can be used as de-icing and/or anti-icing heaters or lightning strike protection, together or separately. In one embodiment, the thermal article 106 and/or pre-copper mesh layer 114 may have its own power driven electronics. Thus, during normal operation one of the thermal article 106 or pre-copper mesh layer 114 may operate to de-ice/anti-ice while the other of the thermal article 106 or pre-copper mesh layer 114 may be turned off. The system will continuously monitor to ensure proper operation, wherein if any failure occurs, the failed system will be turned off and the redundant system will be turned on. Moreover, it should be further appreciated that the anti-icing/de-icing system 100 and/or the thermal article 106 may be controlled and operated in response to environmental sensors (such as temperature sensors, ice detectors, humidity sensors, etc.) and/or structural sensors (such as temperature sensors and operational sensors) via a processing device. For example, in one embodiment the thermal article 106 may be powered on and/or off based on external temperature and/or liquid sensor, wherein when the external temperature is proximate the freezing point (and/or other specified temperature as desired) the thermal article 106 may be energized and when the external temperature is above the freezing point the thermal article 106 may be de-energized.

In accordance with the present invention, the method used to implement the thermal article 106 may be implemented, wholly or partially, by a controller operating in response to a machine-readable computer program and/or programmable logic (ASIC, PGA, FPGA, etc.). In order to perform the prescribed functions and desired processing, as well as the computations therefore (e.g. execution control algorithm(s), the control processes prescribed herein, and the like), the controller may include, but not be limited to, power drivers, current monitoring, temperature sensing/reading articles, a processor(s), computer(s), memory, storage, register(s), timing, interrupt(s), communication interface(s), and input/output signal interface(s), as well as combination comprising at least one of the foregoing. Additionally, the controller (software, firmware and/or any other means of control) may also monitor proper operation of the system. In case a fault is detected it may switch to a redundant system/component (failure could be due to lightning strike or any other problem).

Figure 3B:
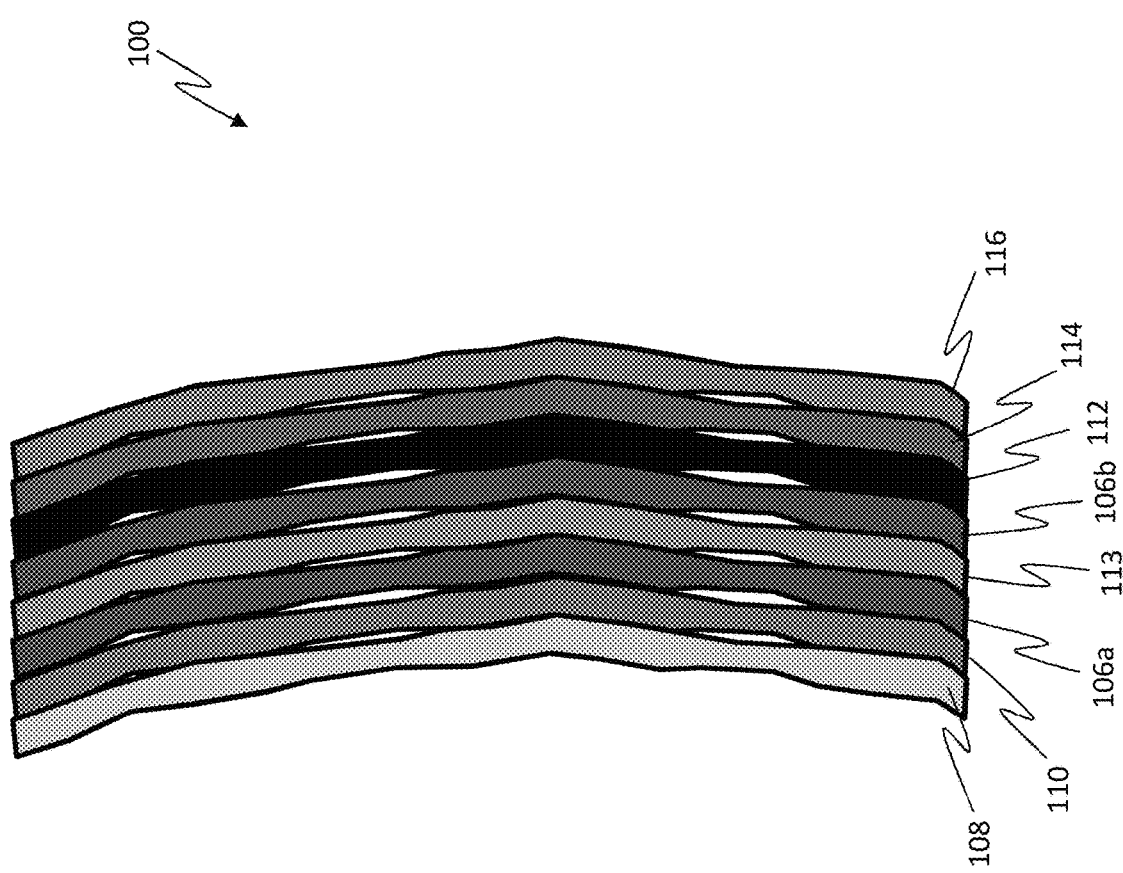
FIG. 3*b* shows a sectional view of the airfoil structure/layup section of FIG. 2, in accordance with another embodiment of the invention.
Figure 3C:
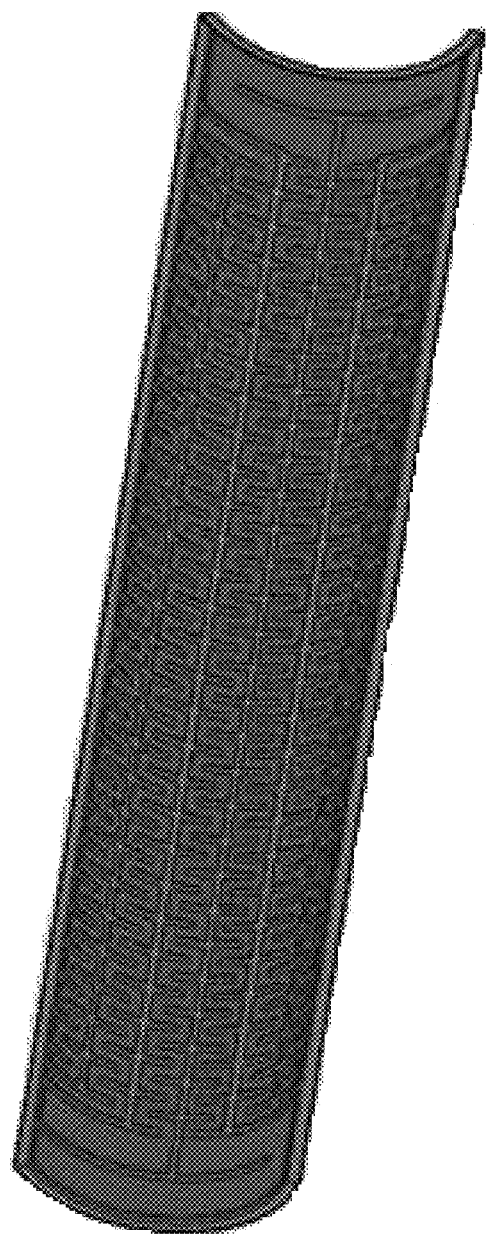
FIG. 3C shows an inside view of a heater element for the anti-icing/de-icing system of FIG. 2 having multiple heating zones, in accordance with another embodiment of the invention

It should be further appreciated that the system may use other means of redundancy on top of lightning protection mesh as desired, such as duplicate set of redundant heaters 106, wherein each redundant heater 106 may be able to fully de-ice and/or anti-ice and may be turned on or off as necessary for proper ice protection function. For example, in still yet another embodiment anti-icing/de-icing system 100 may include more than one thermal article 106 to provide for redundancy (i.e. two independent heating systems). It should be appreciated that multiple heating zones with different power cycling sequences and heat densities may be used to provide for more efficient operation. Referring to FIG. 3B, the anti-icing/de-icing system 100 may be configured to include a first thermal article 106*a* and a second thermal article 106*b*, wherein the first thermal article 106*a* is separated from second thermal article 106*b* by an electrically insulating material 113. This advantageously provides for full redundancy of the anti-icing/de-icing system 100 and a more robust operating capability. Referring to FIG. 3C, an additional embodiment of the anti-icing/de-icing system 100 is provided having a first heating zone 200, a second heating zone 202 and a third heating zone 204, wherein each of the first heating zone 200, second heating zone 202 and/or third heating zone 204 may be controlled separately and/or together.

Figure 10A:
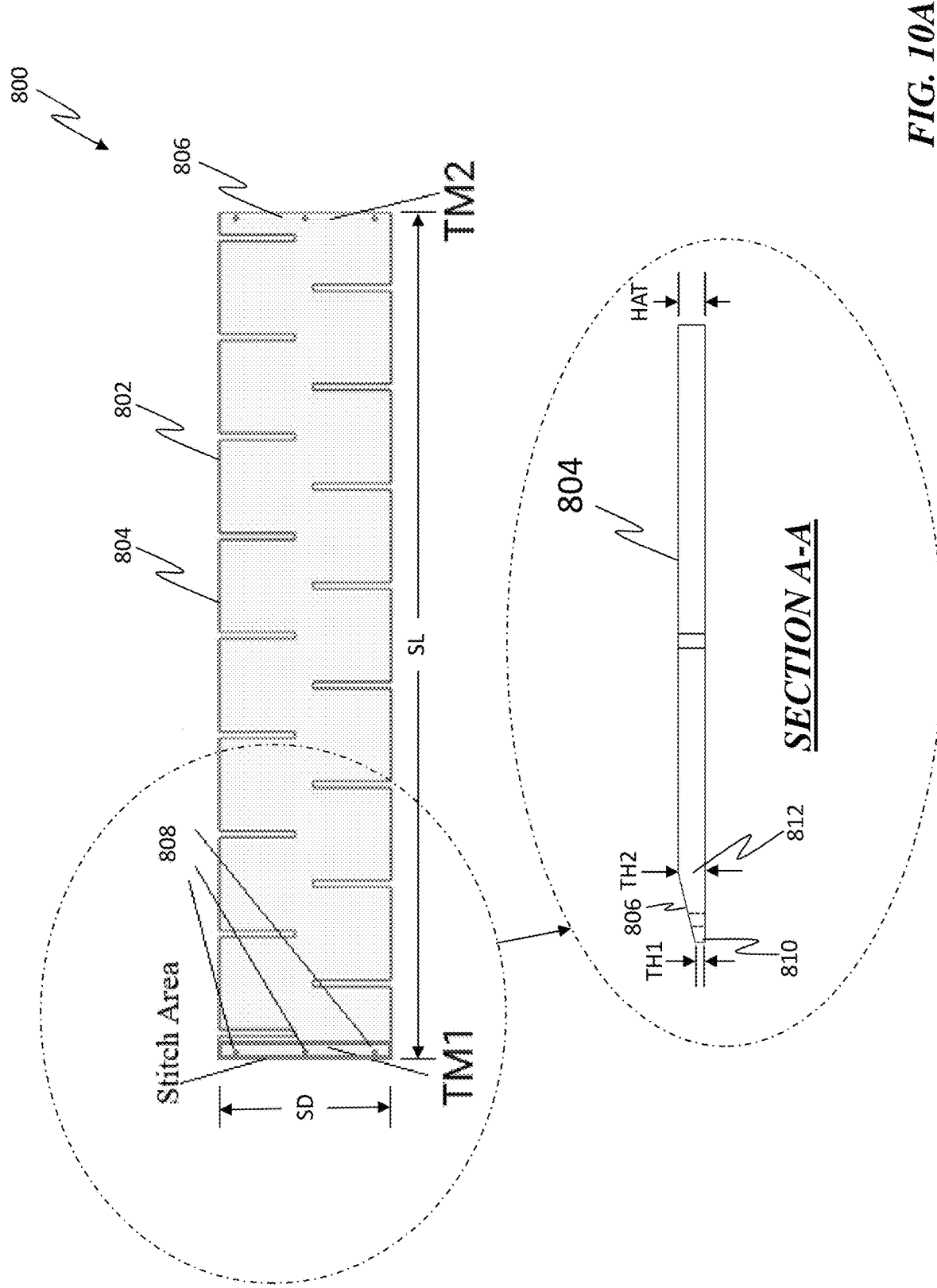
FIG. 10A shows a thermal article heating element for use in the airfoil structure/layup section of FIG. 2, in accordance with still yet another embodiment of the invention.
Figure 10B:
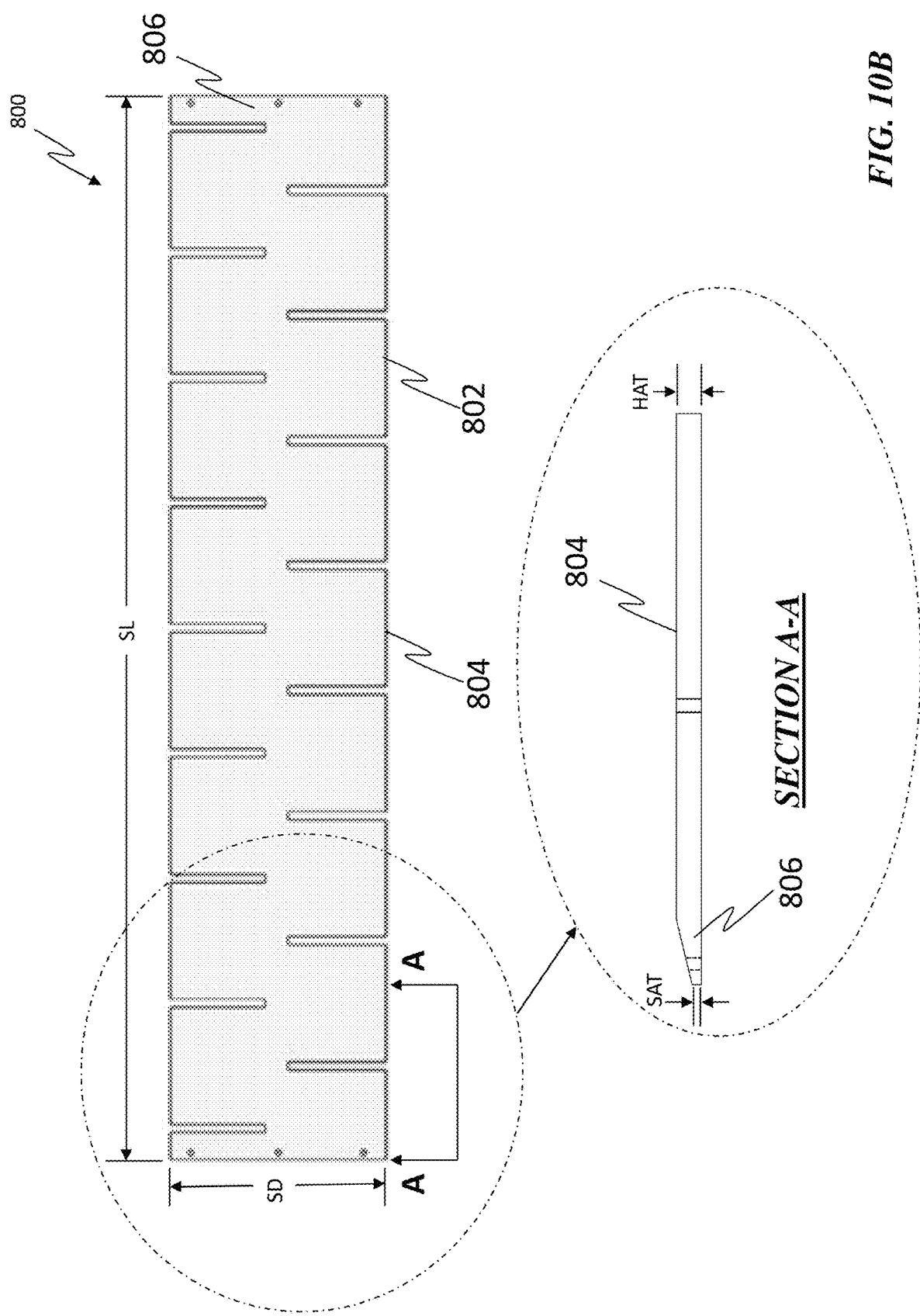
FIG. 10B shows a top down and side view of the thermal article heating element of FIG. 10A.
Figure 10C:
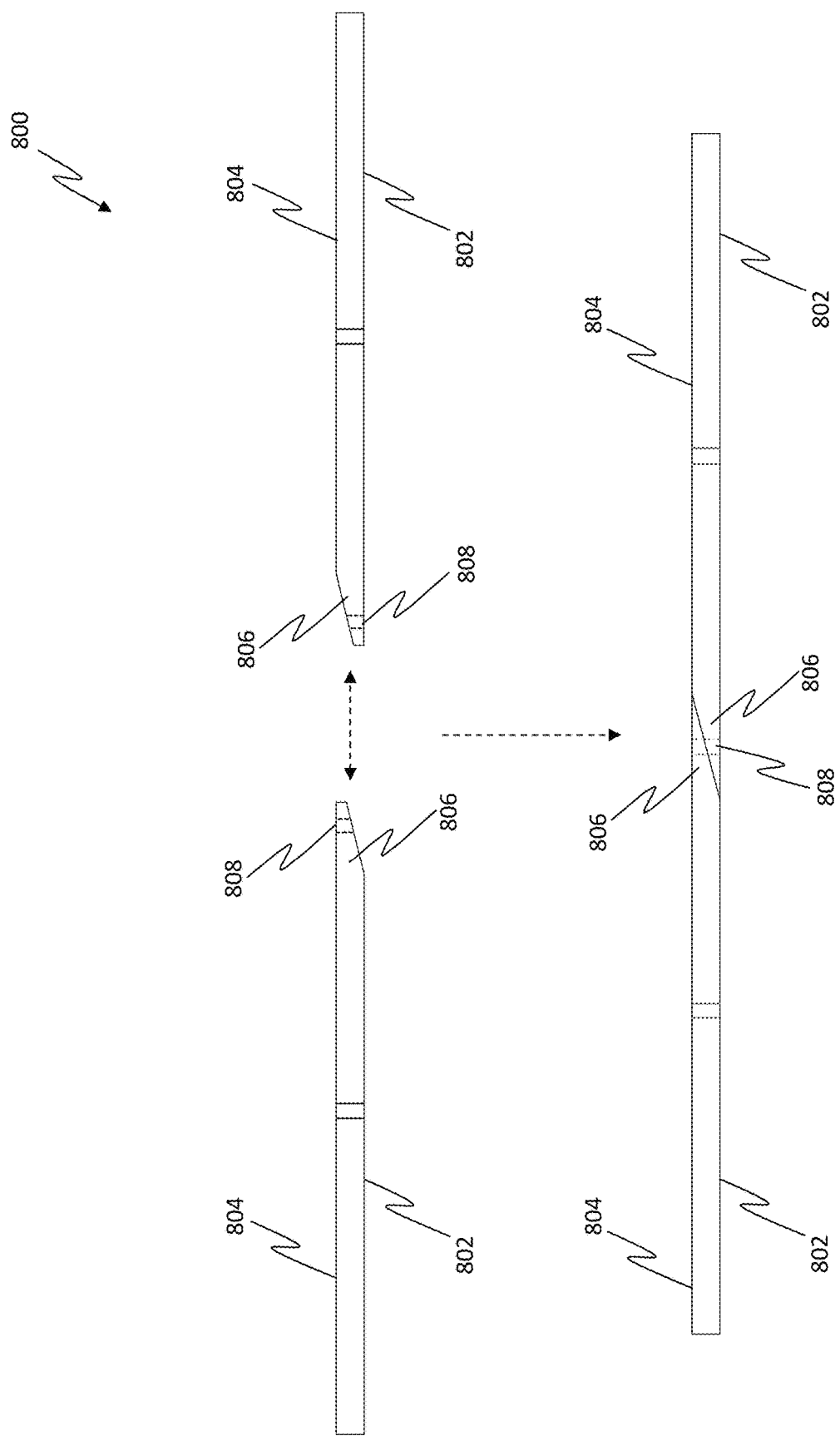
FIG. 10C show a side view of the thermal article of FIG. 10A being associated with a like thermal article, in accordance with an embodiment of the invention.

It should be appreciated that in some applications, the thermal article may have to have a long length, for example 64 feet. In this case, the method of the present invention is to connect a plurality of 'short' thermal article heating elements 800 together to achieve a longer length. Referring to FIG. 10A and FIG. 10B, an additional embodiment of a thermal article heating element 800 is shown and includes an element structure 802 having an element heating area 804 and an element stitch area 806 which defines one or more 'stitch holes' 808. The element structure 802 includes a structure length SL, a structure width SD, an element heating area thickness HAT and an element stitch area thickness SAT. The element stitch area 806 includes a first stitch area side 810 and a second stitch area side 812, wherein the first stitch area side 810 is located adjacent to the element heating area 804. In at least one embodiment, the element stitch area thickness SAT is variable, wherein the element stitch area thickness SAT on the first stitch area side 810 has a thickness TH1 and the element stitch area thickness SAT on the second stitch area side 812 has a thickness TH2, wherein TH2 is thicker than TH1. Referring to FIG. 10C, it should be appreciated that this variability in the element stitch area thickness SAT allows for multiple thermal article heating elements 800 to be 'stitched' together to make a thermal article heating element 800 of any desired length while still being able to control the resistivity.

Figure 10D:
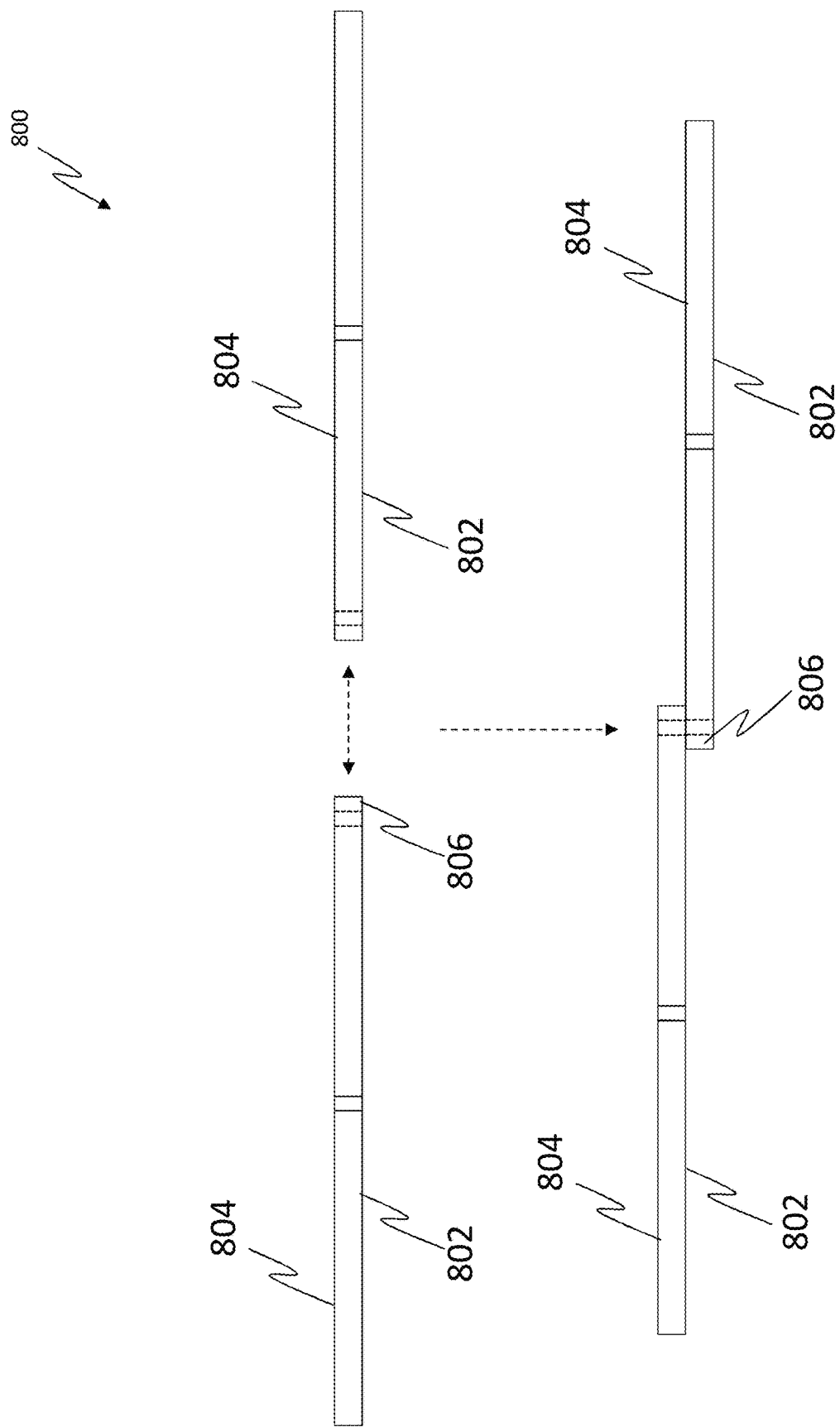
FIG. 10D show a side view of the thermal article of FIG. 10A being associated with a like thermal article, in accordance with another embodiment of the invention.

It should also be appreciated that a plurality of thermal article heating elements 800 may be connected to each other via any method and/or device suitable to the desired end purpose, such as, for example, via adhesive, weld, screws, bolts, etc. In other embodiments the stitch area thickness SAT may be constant and not variable. One such example is shown in FIG. 10D which shows that thermal article heating elements 800 may by connected by overlapping the element stitch areas 806 of adjacent thermal article heating elements 800 and stitching them together.

Figure 11:
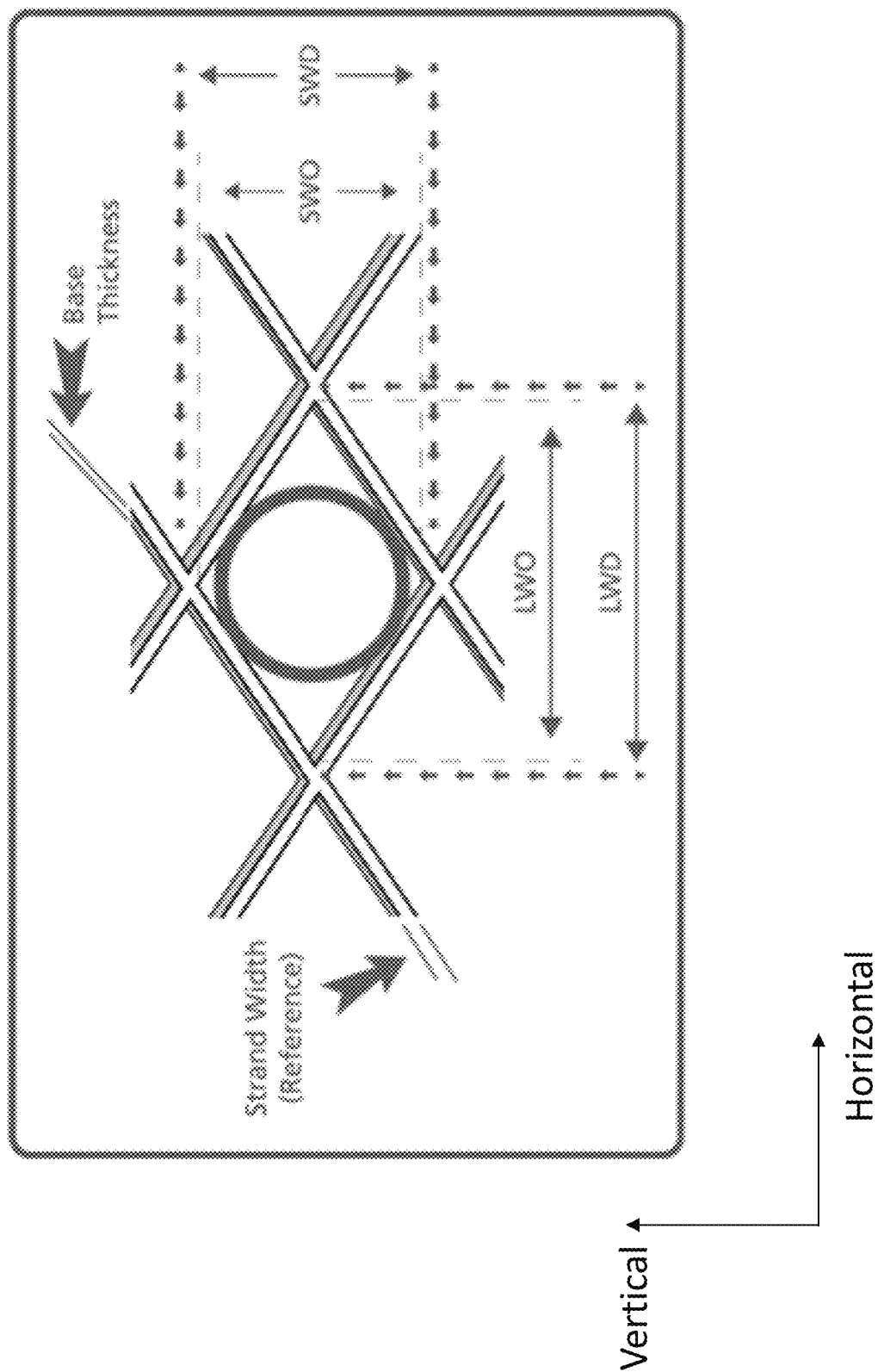
FIG. 11 shows a closeup and a mesh, in accordance with an embodiment of the invention.
Figure 12:
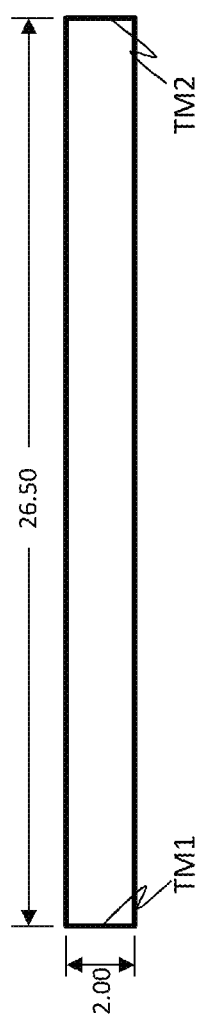
FIG. 12 shows another configuration of a thermal article of the invention, in accordance with an embodiment of the invention.
Figure 13:
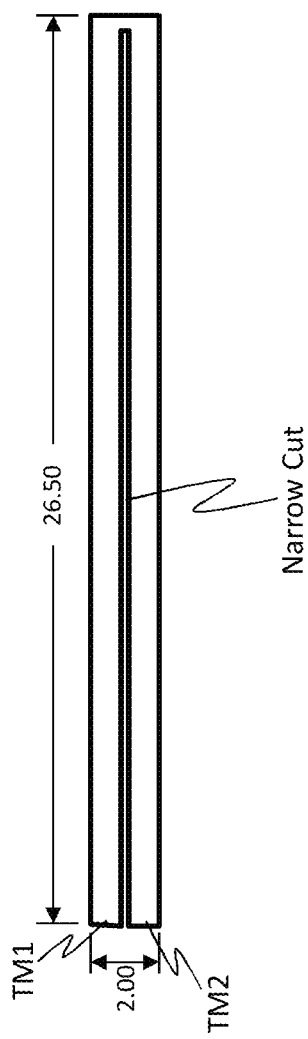
FIG. 13 shows another configuration of a thermal article of the invention, in accordance with an embodiment of the invention.

It should be appreciated that typical expended mesh is characterized by LWD (CW1), SWD (CW2), Thickness, Width and Material. Additional parameters can be derived from these characteristics: Weight, Percent Open Area and Resistance per square meter [$\Omega/m^2$]. Resistance in the LWD (CW1) direction is different from the resistance in the SWD (CW2) direction. Consider the mesh shown in FIG. 11, wherein the mesh will have a larger resistance in the vertical orientation. For example, consider one embodiment which uses stainless steel, wherein the stainless steel is expanded SS05012 mesh (0.004"×2.0 ft×26.5 ft) having a Width=2.0 ft and a Length=26.5 ft. In the vertical direction, the resistance between TM1 and TM2 (See FIG. 12) is approximately 0.95$\Omega$. In the horizontal direction of FIG. 11, the resistance is approximately 0.42$\Omega$. In some applications, larger resistance is simply desired and/or is required to meet power specifications of the system (Power=Voltage$^2$/Resistance). For Example, if for a heater element with dimensions of Width=2.0 ft and Length=26.5 ft the resistance needs to be approximately 3.80$\Omega$ (which is about four (4) times the original resistance), one way to achieve this resistance is to make a cut along the center line the of the strip as shown FIG. 13. In effect, the resistive strip between TM1 and TM2 is now approximately 1 ft wide (half of the original) and the effective strip length between TM1 and TM2 is effectively 53 ft. So, adding the narrow cut along the center line of the strip has caused the effective resistance to be four (4) times greater than the original.

Figure 14:
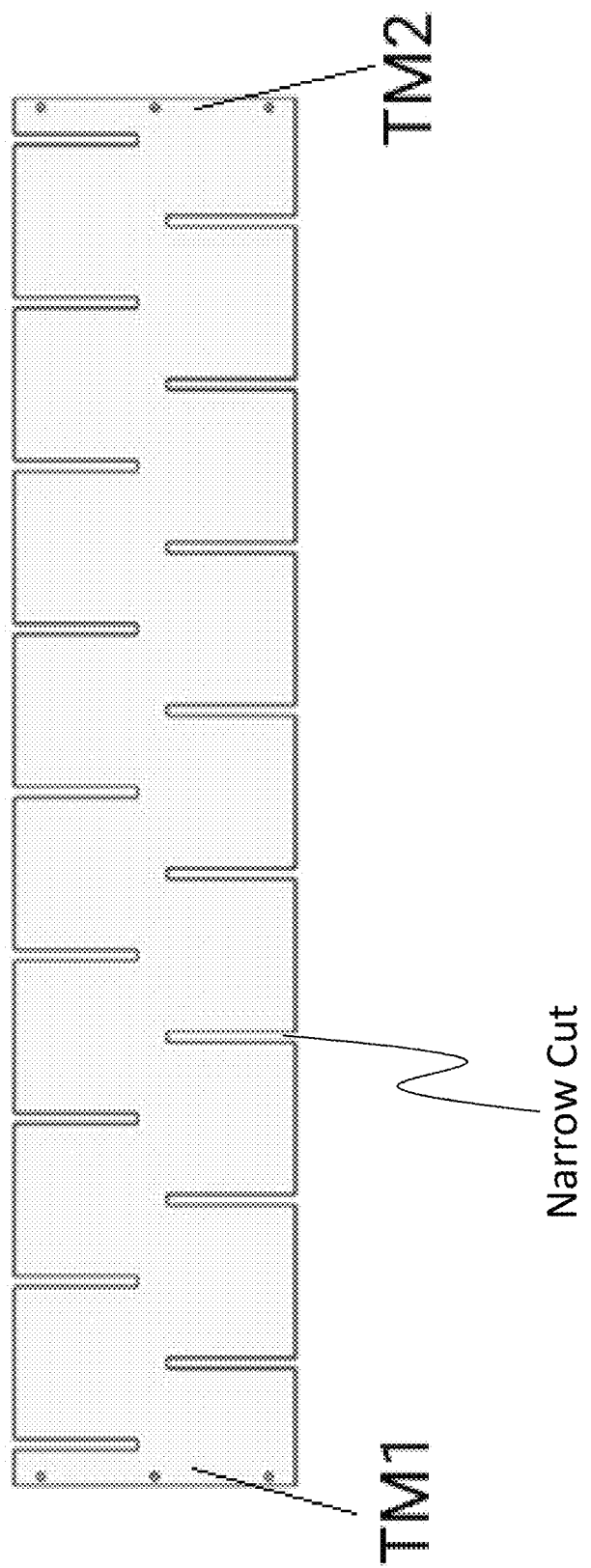
FIG. 14 shows another configuration of a thermal article of the invention, in accordance with an embodiment of the invention.
Figure 15:
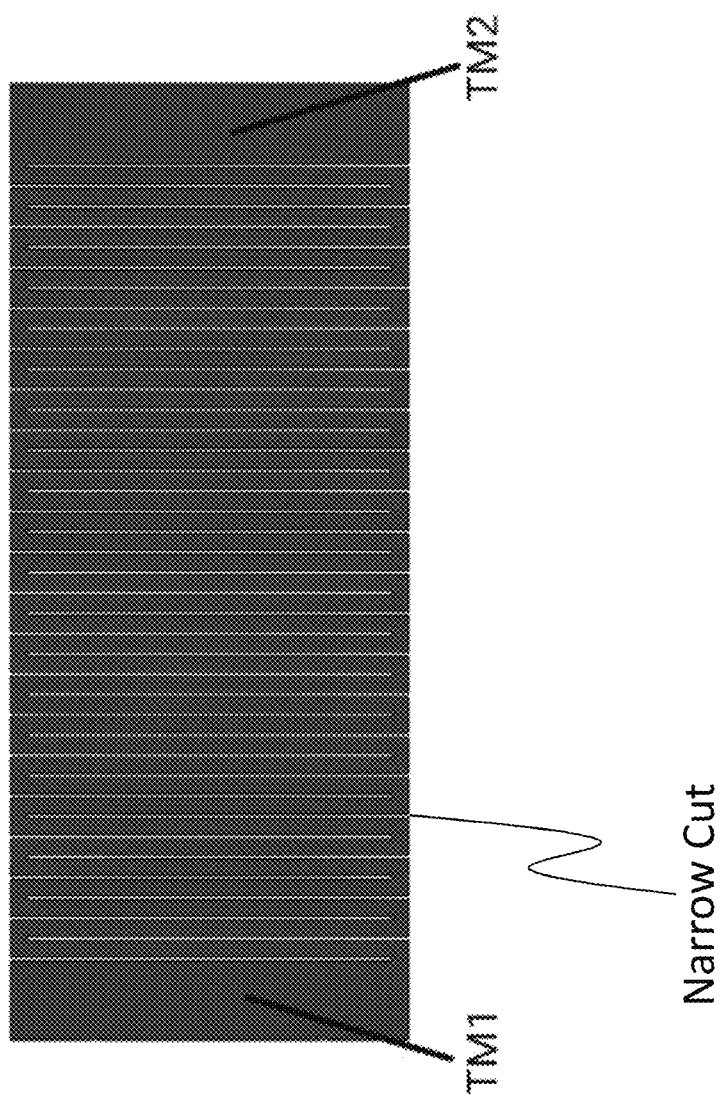
FIG. 15 shows still yet another configuration of a thermal article of the invention, in accordance with an embodiment of the invention.

It should be appreciated that, in accordance with one embodiment of the present invention, by adding a strategically chosen number of cuts of a specific geometry, it is possible to increase the "simple strip" resistance by any desired factor. For example, FIG. 14 shows one embodiment of a heater strip having a plurality of cuts, wherein the cuts increase the resistance between TM1 and TM2 by a small ratio, approximately 1.25 to 2.50. In another example, FIG. 15 shows another embodiment of a heater strip having a plurality of cuts, wherein the cuts increase the resistance between TM1 and TM2 by large ratio, greater than 10. It should also be appreciated that controlling the orientation of the mesh provides another way to get a desired resistance in combination with the cuts as discussed hereinabove.

Moreover, the method to implement the novel anti-icing/de-icing system 100 may be embodied in the form of a computer or controller implemented processes. The method may also be embodied in the form of computer program code containing instructions embodied in tangible media, such as floppy diskettes, CD-ROMs, hard drives, Solid State Drives (SSD) and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Moreover, it is contemplated that elements of one embodiment may be combined with elements of other embodiments as desired. Therefore, it is intended that the invention not be limited to a particular embodiment disclosed herein as the best mode contemplated for carrying out this invention, but that the invention will include all embodiments (individually and/or combined) falling within the scope of the appended claims and/or information. Moreover, unless specifically stated any use of the terms first, second, etc. do not denote any order or importance, but rather the terms first, second, etc. are used to distinguish one element from another.

We claim:

1. An anti-icing/de-icing system for an airfoil structure, wherein the airfoil structure includes multiple layers, comprising:
   a uni-material layer and a woven cloth material; and
   a thermal article, wherein the thermal article is embedded within the airfoil structure to be located between the multiple layers to be adjacent at least one of the uni-material layer and the woven cloth material, and
   wherein the thermal article includes a first terminal end, a second terminal end and a thermal expanded mesh material which connects the first terminal end with the second terminal end, and
   wherein the thermal expanded mesh material is configured to have at least one predetermined resistance between the first terminal end and the second terminal end.

2. The anti-icing/de-icing system of claim 1, wherein the thermal expanded mesh material includes a plurality of cavities located throughout the thermal expanded mesh material.

3. The anti-icing/de-icing system of claim 2, wherein at least one of the pluralities of cavities are at least one of substantially a diamond shape, a circular shape, a rectangular shape and a triangular shape.

4. The anti-icing/de-icing system of claim 2, wherein each of the plurality of cavities include a cavity configuration, a cavity long width and a cavity short width.

5. The anti-icing/de-icing system of claim 4, wherein the airfoil structure is at least one of an aircraft structure, a wind turbine rotor blade, an aircraft rotor blade and a propeller.

6. The anti-icing/de-icing system of claim 1, wherein the thermal expanded mesh material includes a material thickness, wherein the material thickness is at least one of uniform across the thermal expanded mesh material or variable across the thermal expanded mesh material.

7. The anti-icing/de-icing system of claim 1, wherein the thermal expanded mesh material is configured as a thermal strip having a first terminal end, a second terminal end and a thermal strip material, wherein the thermal strip material includes a thermal strip length, a thermal strip width and a thermal strip thickness and connects the first terminal end with the second thermal end.

8. The anti-icing/de-icing system of claim 7,
   wherein the thermal strip width is at least one of a variable width and a uniform width across the thermal strip length, and
   wherein the thermal strip thickness is at least one of a variable thickness and a uniform thickness across the thermal strip length.

9. An anti-icing/de-icing system for an aircraft having an aircraft structure, wherein the aircraft structure includes a uni-material layer and a woven cloth layer, the anti-icing/de-icing system comprising:
a thermal article, wherein the thermal article is embedded within the aircraft structure to be located between the uni-material layer and a woven cloth layer, and
wherein the thermal article includes a first terminal end, a second terminal end and a thermal expanded mesh material which connects the first terminal end with the second terminal end, wherein the thermal expanded mesh material is configured to have at least one predetermined resistance between the first terminal end and the second terminal end.

10. The anti-icing/de-icing system of claim 9, wherein the thermal expanded mesh material is configured as a thermal expanded mesh and includes a plurality of cavities located throughout the thermal expanded mesh material.

11. The anti-icing/de-icing system of claim 10, wherein at least one of the pluralities of cavities are at least one of substantially a diamond shape, a circular shape, a rectangular shape and or a triangular shape.

12. The anti-icing/de-icing system of claim 11, wherein each of the plurality of cavities include a cavity configuration, a cavity long width and a cavity short width.

13. The anti-icing/de-icing system of claim 12, wherein the size and shape of the plurality of cavities are uniform across the thermal expanded mesh material.

14. The anti-icing/de-icing system of claim 9, wherein the thermal expanded mesh material includes a material thickness, wherein the material thickness is at least one of uniform across the thermal expanded mesh material or variable across the thermal expanded mesh material.

15. The anti-icing/de-icing system of claim 9, wherein the thermal expanded mesh material is configured as a thermal strip having a first terminal end, a second terminal end and a thermal strip material, wherein the thermal strip material includes a thermal strip length, a thermal strip width and a thermal strip thickness and connects the first terminal end with the second thermal end.

16. The anti-icing/de-icing system of claim 9, wherein the thermal expanded mesh material includes a first leg having a first leg width and a second leg having a second leg width, wherein at least one of,
the first leg width is larger than the second leg width, and
the first leg width is equal to the second leg width.

17. The anti-icing/de-icing system of claim 9, wherein the thermal expanded mesh material is constructed from at least one of a copper material, an aluminum material, a stainless-steel material, a nickel copper material, a pure metal material, an alloy material and/or any combination thereof.

18. An anti-icing/de-icing system for an aircraft having an aircraft structure, wherein the aircraft structure includes a first woven cloth material layer, a uni-material layer, a second woven cloth material layer, a pre-copper mesh layer and a painted surface layer, the anti-icing/de-icing system comprising:
a thermal article, wherein the thermal article is embedded within the aircraft structure to be located between the uni-material layer and the second woven cloth layer, and
wherein the thermal article includes a first terminal end, a second terminal end and a thermal expanded mesh material which connects the first terminal end with the second terminal end, wherein the thermal expanded mesh material is configured to have at least one predetermined resistance between the first terminal end and the second terminal end.

\* \* \* \* \*